US008745352B2

(12) United States Patent
Sakhalkar et al.

(10) Patent No.: US 8,745,352 B2
(45) Date of Patent: Jun. 3, 2014

(54) OPTIMIZED APPROACH TO PARALLELIZE WRITING TO A SHARED MEMORY RESOURCE

(75) Inventors: Ameya Sakhalkar, Karnataka (IN); Anunay Tiwari, Pune (IN); Daniel Alan Wood, Fremont, CA (US); Kantikiran Krishna Pasupuleti, Visakhapatnam (IN)

(73) Assignee: Sybase, Inc., Dublin, CA (US)

(*) Notice: Subject to any disclaimer, the term of this patent is extended or adjusted under 35 U.S.C. 154(b) by 375 days.

(21) Appl. No.: 13/340,826

(22) Filed: Dec. 30, 2011

(65) Prior Publication Data
US 2013/0173866 A1 Jul. 4, 2013

(51) Int. Cl.
| G06F 12/00 | (2006.01) |
| G06F 13/00 | (2006.01) |
| G06F 13/28 | (2006.01) |
| G06F 12/08 | (2006.01) |
| G06F 9/52 | (2006.01) |
| G06F 13/16 | (2006.01) |
| G06F 17/30 | (2006.01) |

(52) U.S. Cl.
CPC ............ *G06F 12/0855* (2013.01); *G06F 9/52* (2013.01); *G06F 13/1663* (2013.01); *G06F 17/30368* (2013.01); *G06F 17/30362* (2013.01)
USPC .............. 711/168; 711/135; 711/169

(58) Field of Classification Search
CPC ............... G06F 17/30368; G06F 17/30362; G06F 9/52; G06F 12/0855; G06F 13/1663
USPC .......................... 711/135, 168–169
See application file for complete search history.

(56) References Cited

U.S. PATENT DOCUMENTS

| 6,721,765 B2 * | 4/2004 | Ghosh et al. ............... 1/1 |
| 2009/0083517 A1 * | 3/2009 | Riddle ............... 712/30 |
| 2009/0240739 A1 * | 9/2009 | Bhatt et al. ............ 707/200 |
| 2012/0005158 A1 * | 1/2012 | Bhatt et al. ............ 707/609 |
| 2012/0304003 A1 * | 11/2012 | Goldstein et al. ............ 714/15 |

* cited by examiner

*Primary Examiner* — Ryan Bertram
(74) *Attorney, Agent, or Firm* — Sterne, Kessler, Goldstein & Fox P.L.L.C.

(57) ABSTRACT

Reducing contentions between processes or tasks that are trying to access shared resources is described herein. According to embodiments of the invention, a method of writing a set of data associated with a task to a memory resource is provided. The method includes calculating the amount of memory required to write said data to the memory resource and updating an expected end marker to reflect the amount of memory required to write the data to the memory resource. A flag is then set to an incomplete state, and the data is written to the memory resource. The flag can be set to a complete state and an end marker is updated. The end marker indicates the end of the data stored in the memory resource.

22 Claims, 25 Drawing Sheets

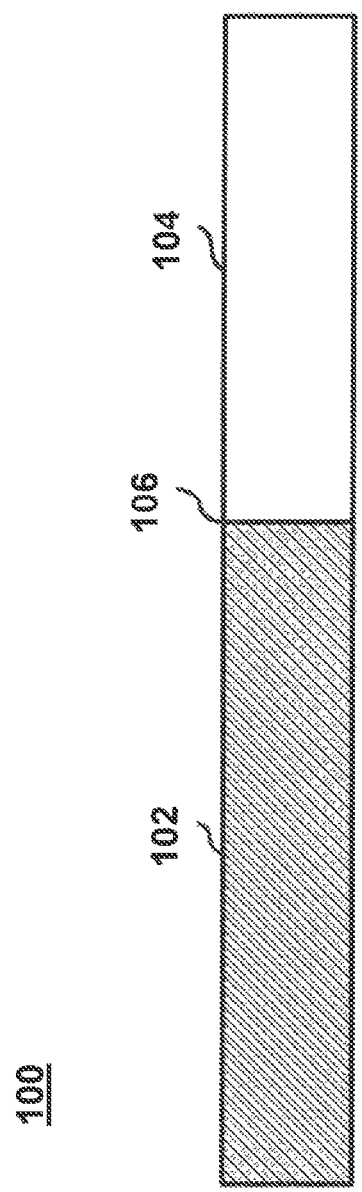

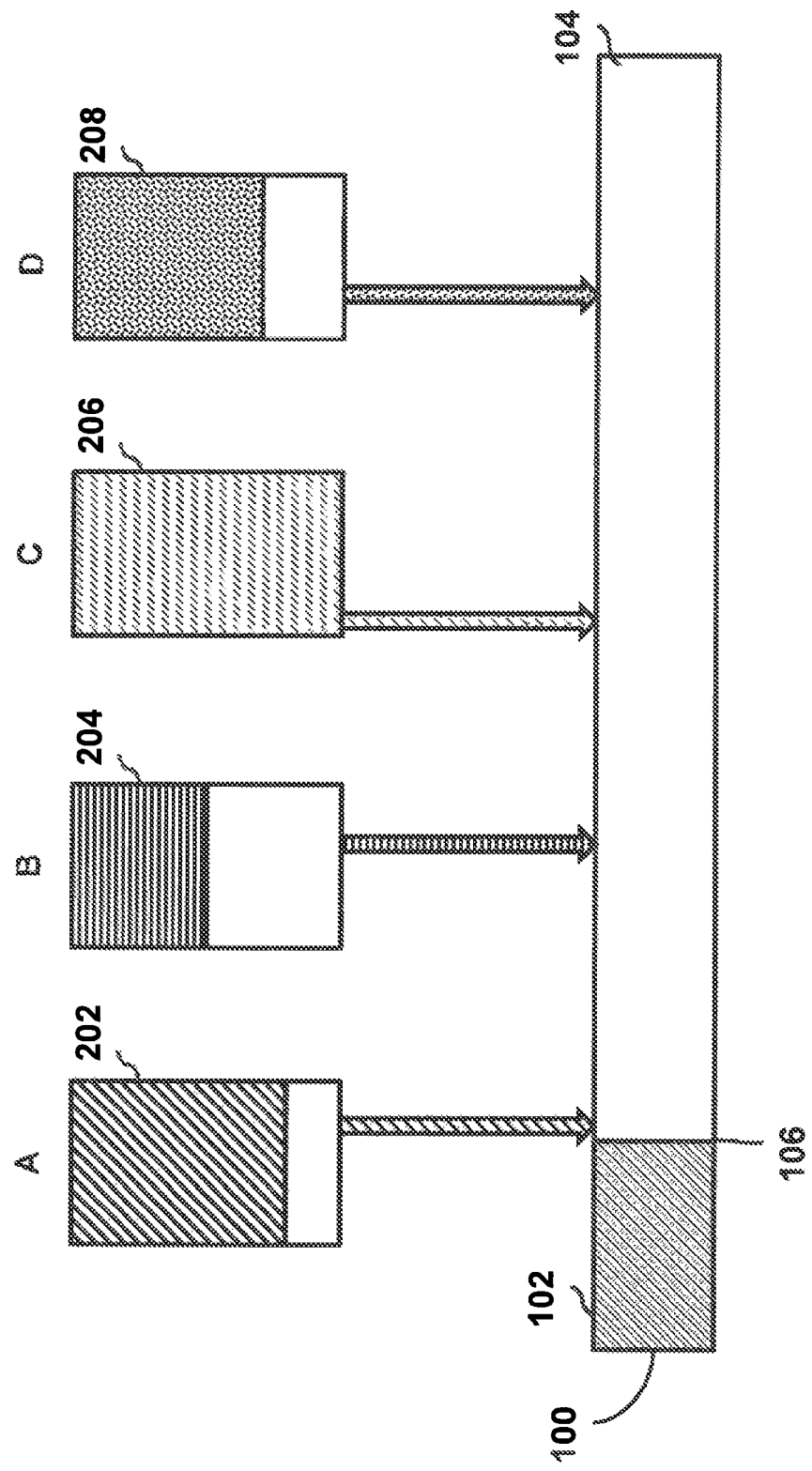

OPTIMIZED APPROACH TO PARALLELIZE WRITING TO A SHARED MEMORY RESOURCE

BACKGROUND OF THE INVENTION

1. Field of the Invention

The invention relates generally to database systems and more specifically to optimizing the way multiple tasks can write data to a shared memory by allowing them to do so in parallel.

2. Related Art

Modern computer systems frequently employ numerous shared resources that can be used by multiple tasks being performed by the computer system. Frequently, and for various reasons, it is desirable for some of the shared resources to only be used by one task at a time. For instance, in database systems, a common type of shared resource is memory. Limiting the use of the memory to one task at a time helps to maintain the integrity of the data stored therein. Accordingly, under such a scheme, when two tasks want to write to the memory, a second task must sometimes wait for a first task to complete using the memory resource in order to use the memory resource itself. This kind of situation—one where a task must wait for another task to finish using a resource in order to use it itself—is referred to as a contention.

Contentions, while the result of necessary safeguards, can have a number of negative effects on the operation of a computer system. For instance, a system that experiences too many contentions of the kind described above can have greatly reduced throughput, which can result in slower than optimal operation of a database system. Thus, there exists a need in the art for systems and methods that reduce or minimize the occurrence of contentions, but that still guarantee data integrity.

BRIEF SUMMARY OF THE INVENTION

Embodiments of the invention include systems, methods, computer-readable media, and program products that facilitate reducing or minimizing the number of contentions between a plurality of tasks attempting to use a shared resource simultaneously. For instance, according to some embodiments of the invention, a method of reducing contention between a plurality of tasks attempting to simultaneously write data to a memory resource in a computer system is presented. According to aspects of the invention, the memory resource can include an end marker that indicates an end of the data stored in the memory resource. According to the method, the space required in the memory resource to write a first set of data associated with the first task is calculated. An expected end marker is then updated to reflect the space required to store the first set of data. Additionally, the space required to write a second set of data to the memory resource is calculated and the expected end marker is updated based on the current expected end marker to reflect the space required to store the second set of data. The first and second sets of data can then be written to the memory resource in parallel and an end marker updated.

According to embodiments of the invention, a method of writing a set of data associated with a task to a memory resource is provided. The method includes calculating the amount of memory required to write said data to the memory resource and to update an expected end marker to reflect the amount of memory required to write the data to the memory resource. A flag is then set to an incomplete state, and the data is written to the memory resource. The flag can be set to a complete state and an end marker is updated after the data is written to the memory resource. The end marker indicates the end of the data stored in the memory resource.

According to embodiments of the invention, a computer readable medium containing instructions is provided. The instructions, when executed by a computer, cause the computer to calculate the amount of memory required to write said data to the memory resource and update an expected end marker to reflect the amount of memory required to write the data to the memory resource. The instructions cause the computer to set a flag to an incomplete state, and write the data to the memory resource. The computer can set the flag to a complete state and update an end marker. The end marker indicates the end of the data stored in the memory resource.

According to embodiments of the invention, a computer system is provided. The computer system includes a computer resource and a processor. The processor is configured to calculate the amount of memory required to write said data to the memory resource and update an expected end marker to reflect the amount of memory required to write the data to the memory resource. The processor can set a flag to an incomplete state, and write the data to the memory resource. The processor can set the flag to a complete state and update an end marker after writing the data to the memory resource. The end marker indicates the end of the data stored in the memory resource.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

FIG. 1 depicts a generic memory resource according to embodiments of the invention.

FIGS. 2A-2E depict a process of writing data from multiple tasks to a memory resource according to embodiments of the invention.

DETAILED DESCRIPTION OF THE INVENTION

Figure 2B:
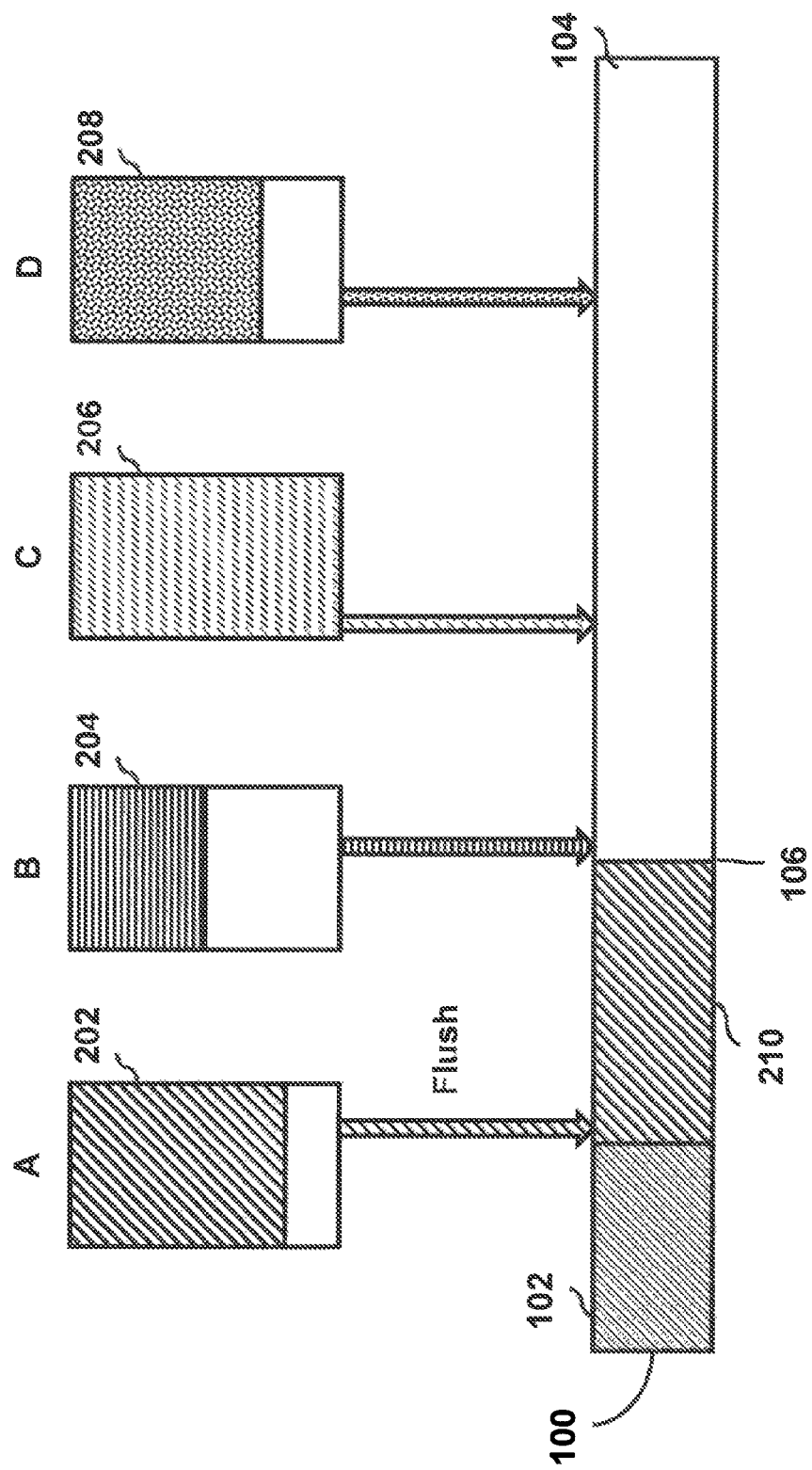

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The invention will be described within the context of a database system. However, a person of ordinary skill in the art would not understand the invention to be limited to database systems. Instead, the invention is applicable to any number of possible systems such as standard computer systems, distributed computer systems, or any systems that share common resources, to name a few.

In database systems, increasing throughput is very desirable. A number of aspects of a database system can be changed or improved upon to increase throughput. For instance, many technologies leverage improved hardware with more computing power in order to increase throughput. However, these kinds of hardware improvements can only increase throughput up to a certain limit due to limitations imposed by the software schemes they use.

For instance, contentions pose a problem with regard to increasing throughput. Contentions arise when two tasks wish to use a shared resource that has a lock or semaphore associated with it. As an example, a situation might arise where two tasks, task 1 and task 2, both wish to write to a shared memory. In order to prevent the second task from attempting to write to the same memory addresses as the first task, shared memory will typically have a marker that indicates the end of the data currently being written. When a task writes to the memory, it "locks" the marker so that no other task can alter it and holds the lock until it has fully written the data. Once the data has been written, the task updates the marker to indicate the address at the end of the data that has been written and unlocks the marker. While this scheme is necessary to keep the second task from over-writing or attempting to write into the same portion of memory as the first task, it reduces throughput because the second task must wait for the first task to finish the relatively time-consuming exercise of writing before it can write its own data to the shared memory.

By way of example, this phenomenon occurs in some implementations of the Adaptive Server® Enterprise (ASE) system from Sybase®. Every task running in the ASE system has a private log cache (PLC) that is used to buffer the new log records generated before writing them to a shared transaction log. When log records are "flushed" from the PLC and written to the transaction log, they are always appended to the transaction log. From time to time, however, multiple tasks want to flush their PLCs to the transaction log at the same time. Dealing with this eventuality requires synchronization amongst the tasks writing to the transaction log.

In an embodiment, synchronization between multiple simultaneous tasks attempting to flush their PLC to the transaction log is achieved using something called the append log semaphore. Any task attempting to flush its PLC will "hold" the semaphore. When a subsequent task attempts to acquire the semaphore while it is being held by a first task, it must wait (e.g., sleep) until the task holding the semaphore relinquishes it. Thus, there is a contention in the ASE system. This situation is explained, below, with reference to the figures.

FIG. 1 depicts a shared memory resource 100, such as the transaction log, described above. A person of ordinary skill in the art would recognize that the shared memory resource 100 could comprise any number of suitable memory devices such as magnetic disk drives, optical disk drives, ROM, RAM, Flash memory, etc. The shared memory resource depicted in FIG. 1 comprises a portion 102 to which data has been written and a portion 104, which is free. Marker 106 indicates the end of the written data on the shared memory resource.

FIGS. 2A-2E depict a sequential process of writing data from several tasks to the shared memory resource 100 that results in contention. As shown in FIG. 2A, tasks A, B, C, and D have data 202, 204, 206, and 208 (e.g., PLCs) that they seek to append to the shared memory 100 after the end data marker 106. First, task A writes the data 202 to memory position 210 and updates the end of data marker 106 to reflect the new position of the end of the data, as is shown in FIG. 2B. At this point, tasks B, C, and D must wait to write their data to the shared memory resource 100.

Figure 2C:
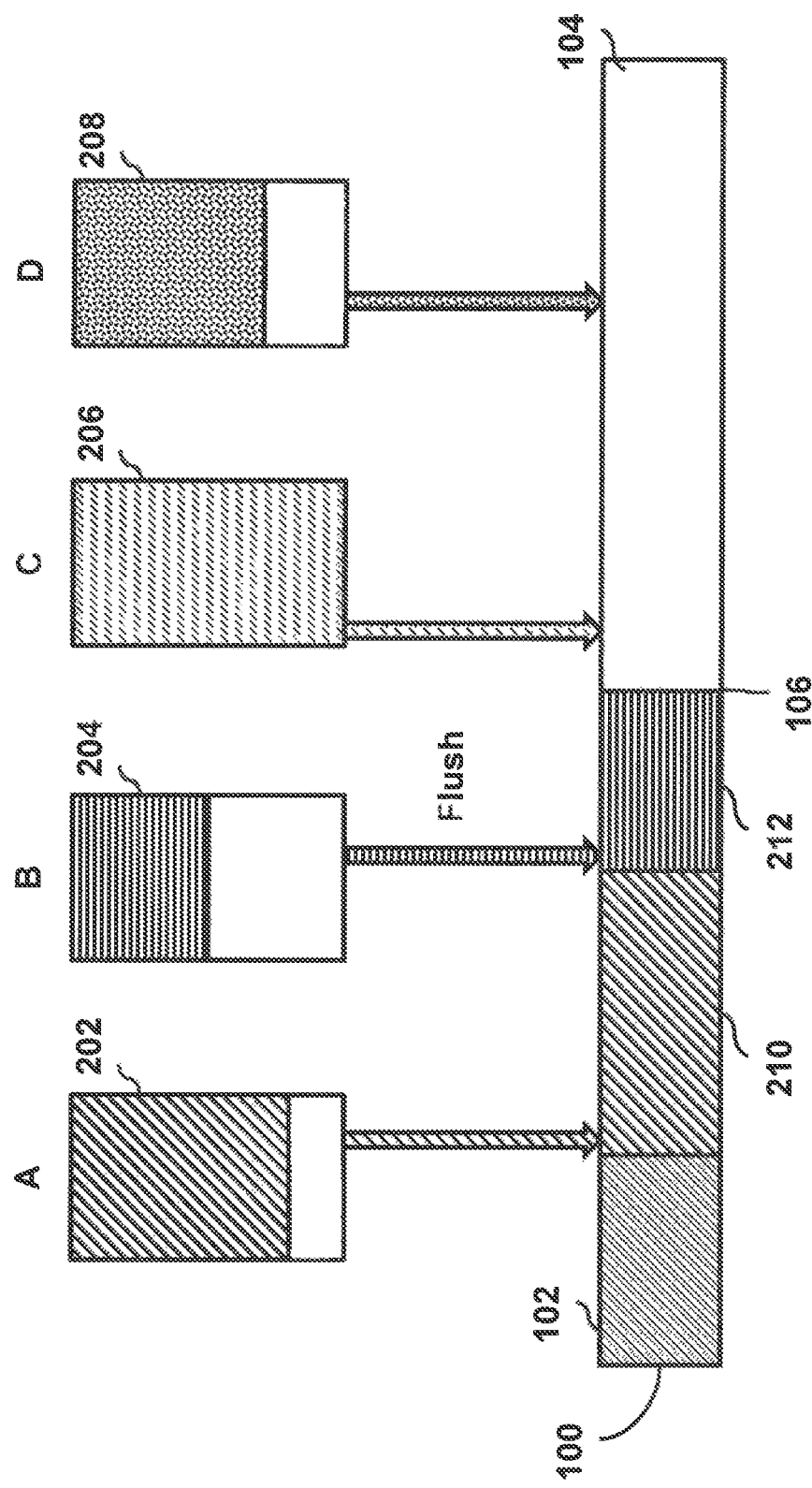

In FIG. 2C task A has completed flushing its data, so task B can now flush its data 204 to the shared memory 100 at memory position 212. Tasks C and D must wait. Once task B has fully written the required data, the end marker 106 can be updated to reflect the new end after task B has written its data.

Figure 2D:
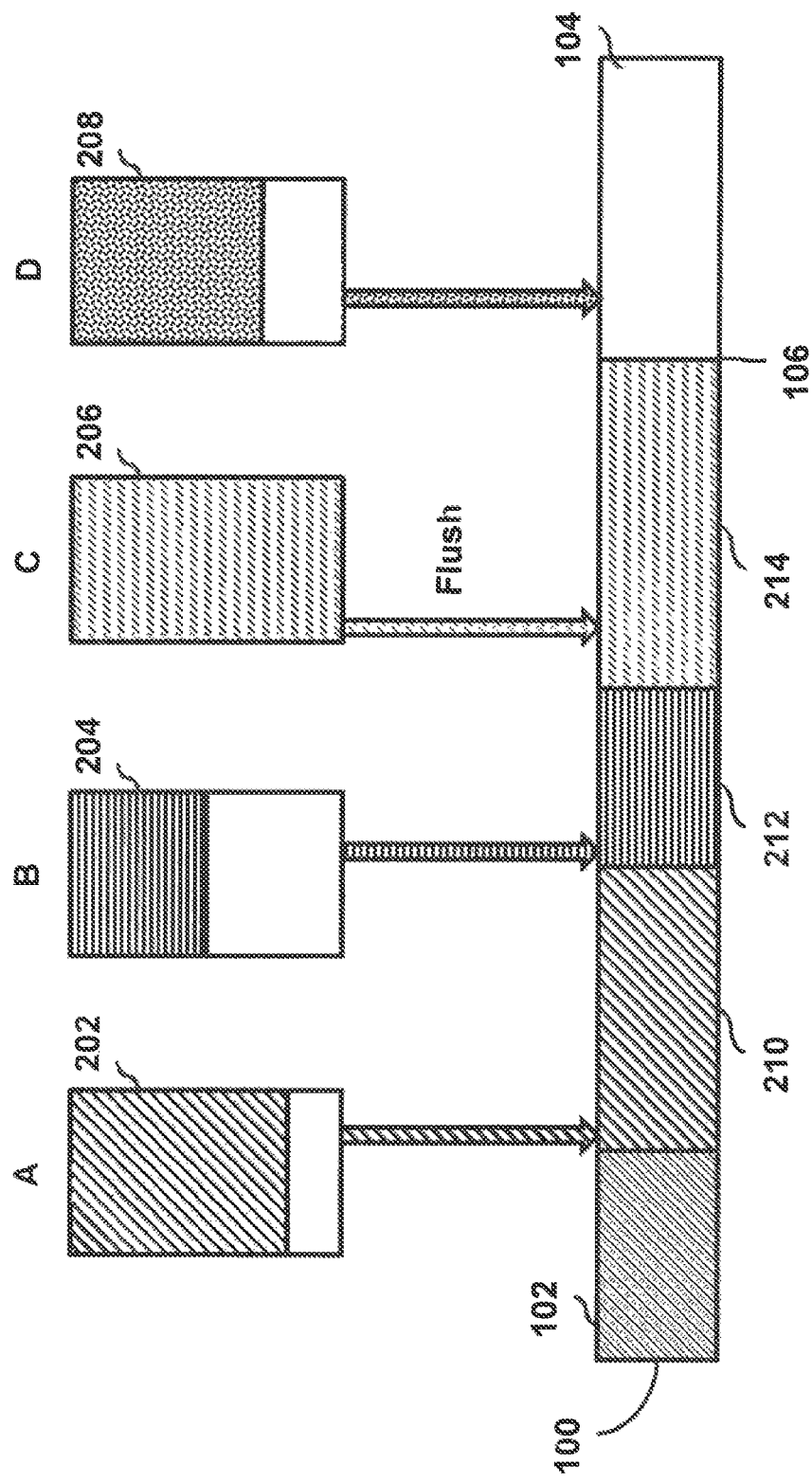
Figure 2E:
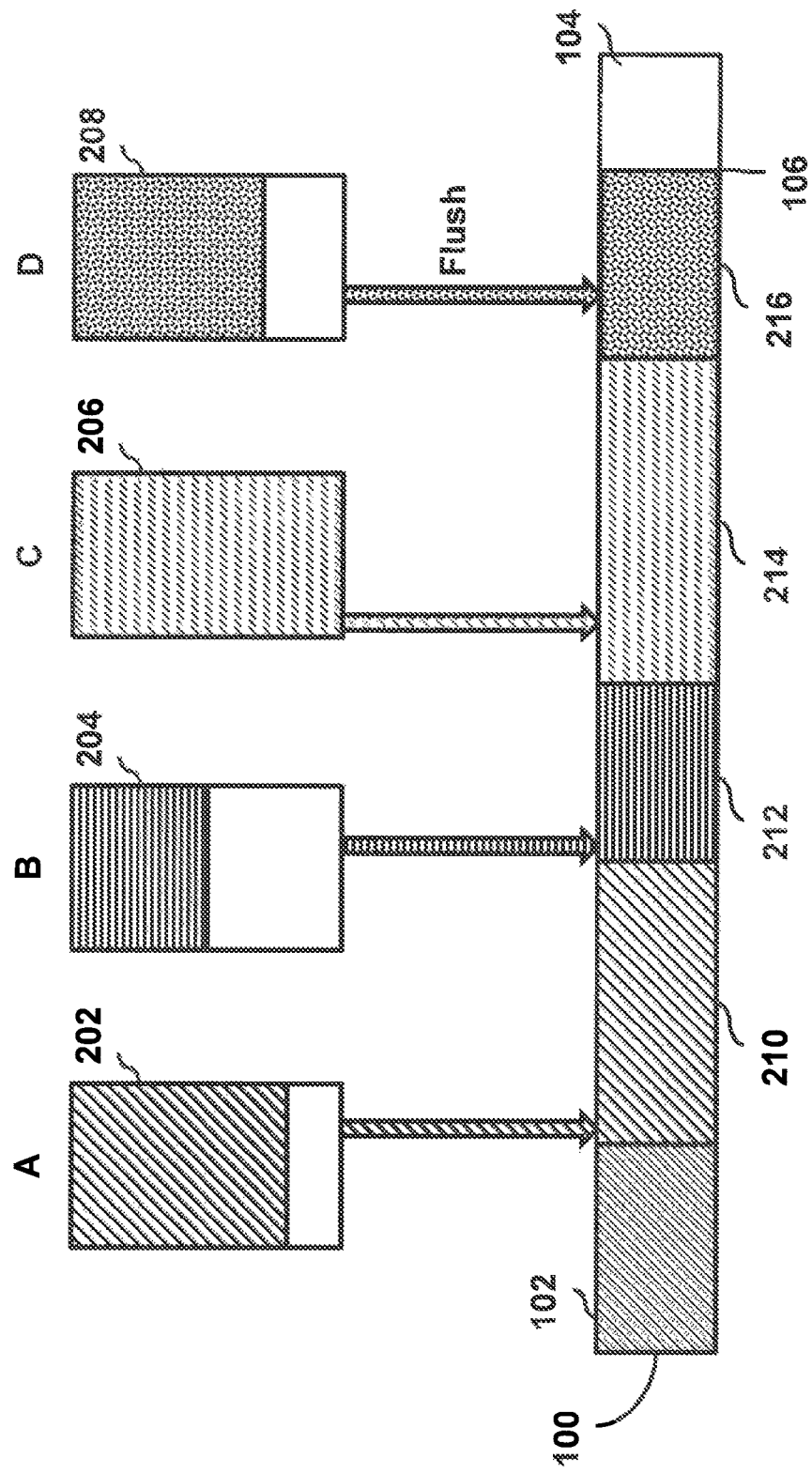

Once task B is finished writing its data 204, task C can flush its data 206 to the shared memory 100. This is shown in FIG. 2D. Again, the end maker 106 is updated to reflect the new end of the written data. Finally, once all the other tasks have written their data to the shared memory 100, task D can write its data 208 to the shared memory device 100 at memory location 216 and update the end marker 106, as shown in FIG. 2E.

The advantage of the sequential method described above is that data integrity is maintained; no task overwrites the data of any other task. However, there is also a problem with the sequential method of writing data to the shared memory 100 in that the tasks must wait for the previous one in order to write its data—i.e., there is contention. A better method would reduce this contention by allowing the tasks to write their data to the memory 100 in parallel while still maintaining the integrity of the data. Such a method is depicted in FIGS. 3A-3F.

FIGS. 3A-3F depict a parallel process for writing data to a shared memory resource according to embodiments of the present invention. As shown in FIGS. 3A-3F, tasks A, B, C, and D each seek to write their data 302, 304, 306, and 308 to the shared memory 100. End marker 318 marks the last portion of the shared up to which space has been reserved to write data in the memory.

Figure 3A:
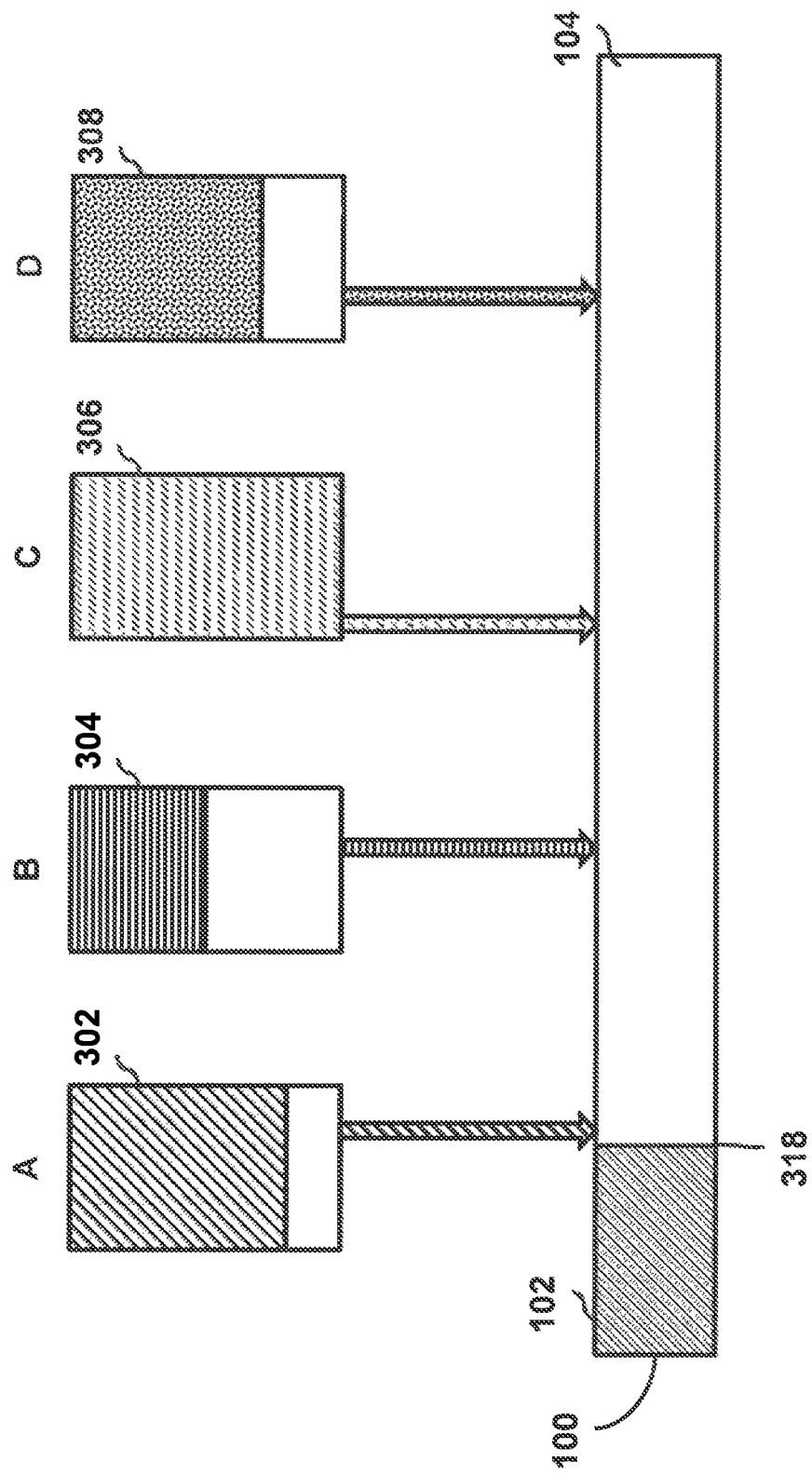
FIGS. 3A-3F depict a process of writing data from multiple tasks to a memory resource according to embodiments of the invention.
Figure 3B:
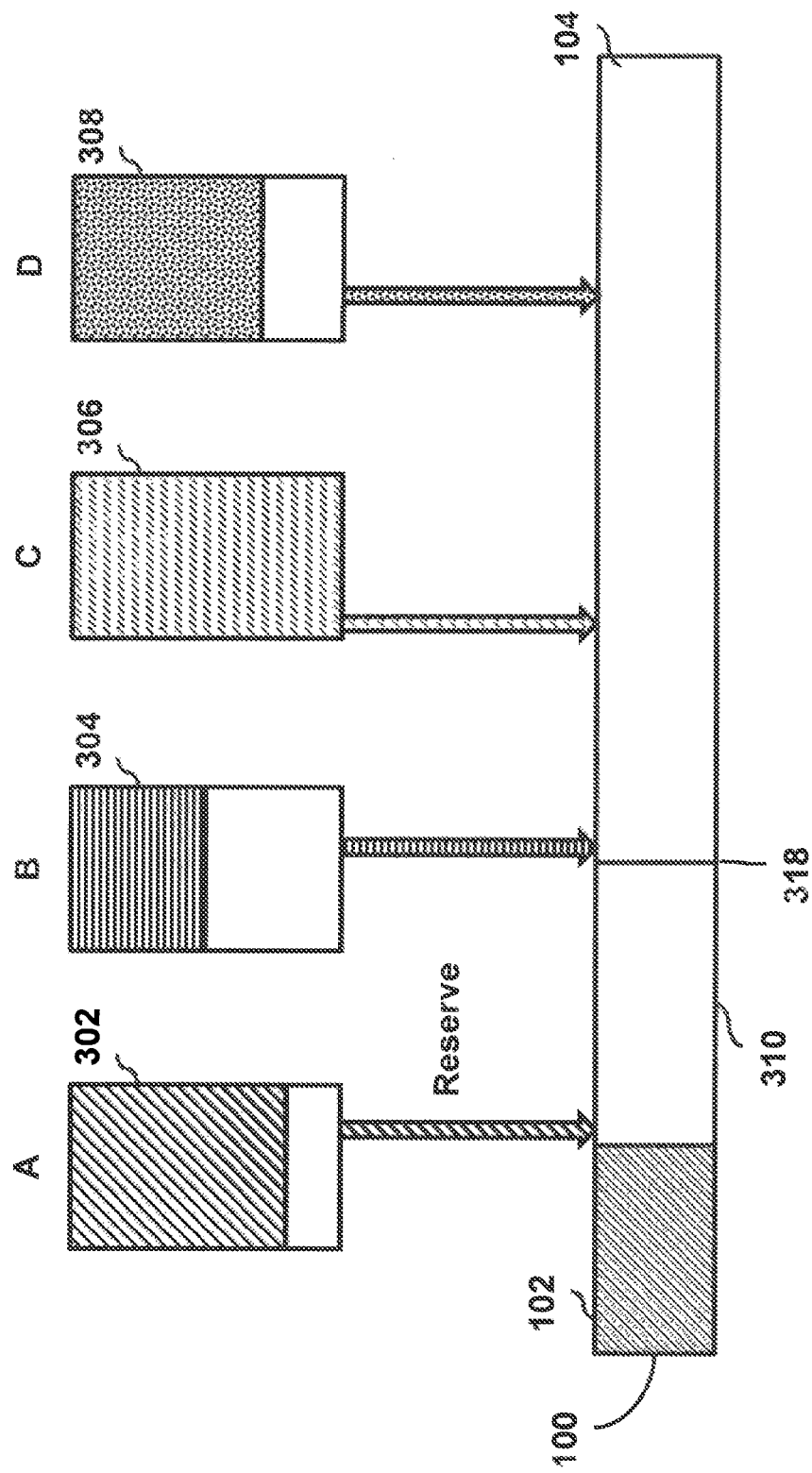
Figure 3C:
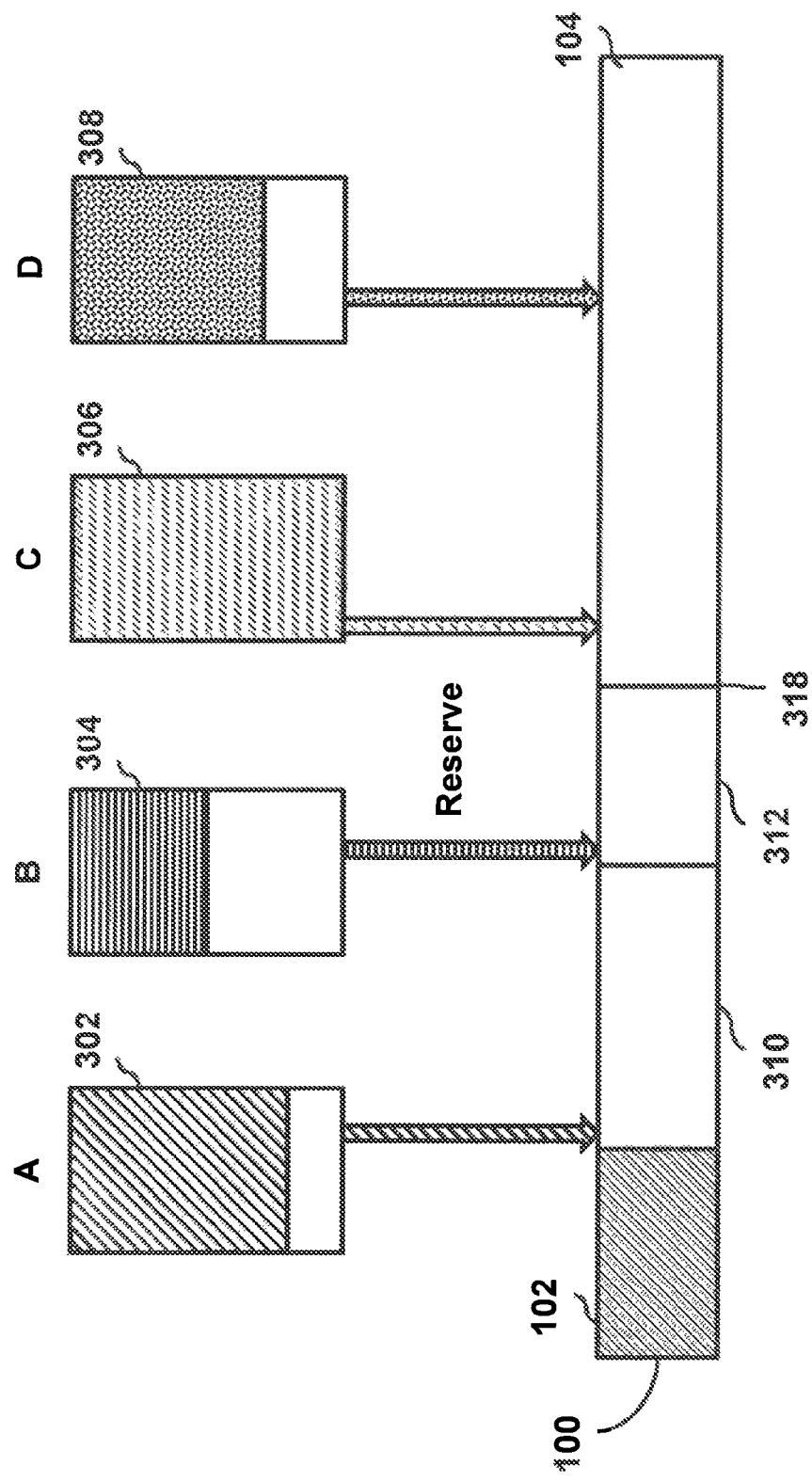
Figure 3D:
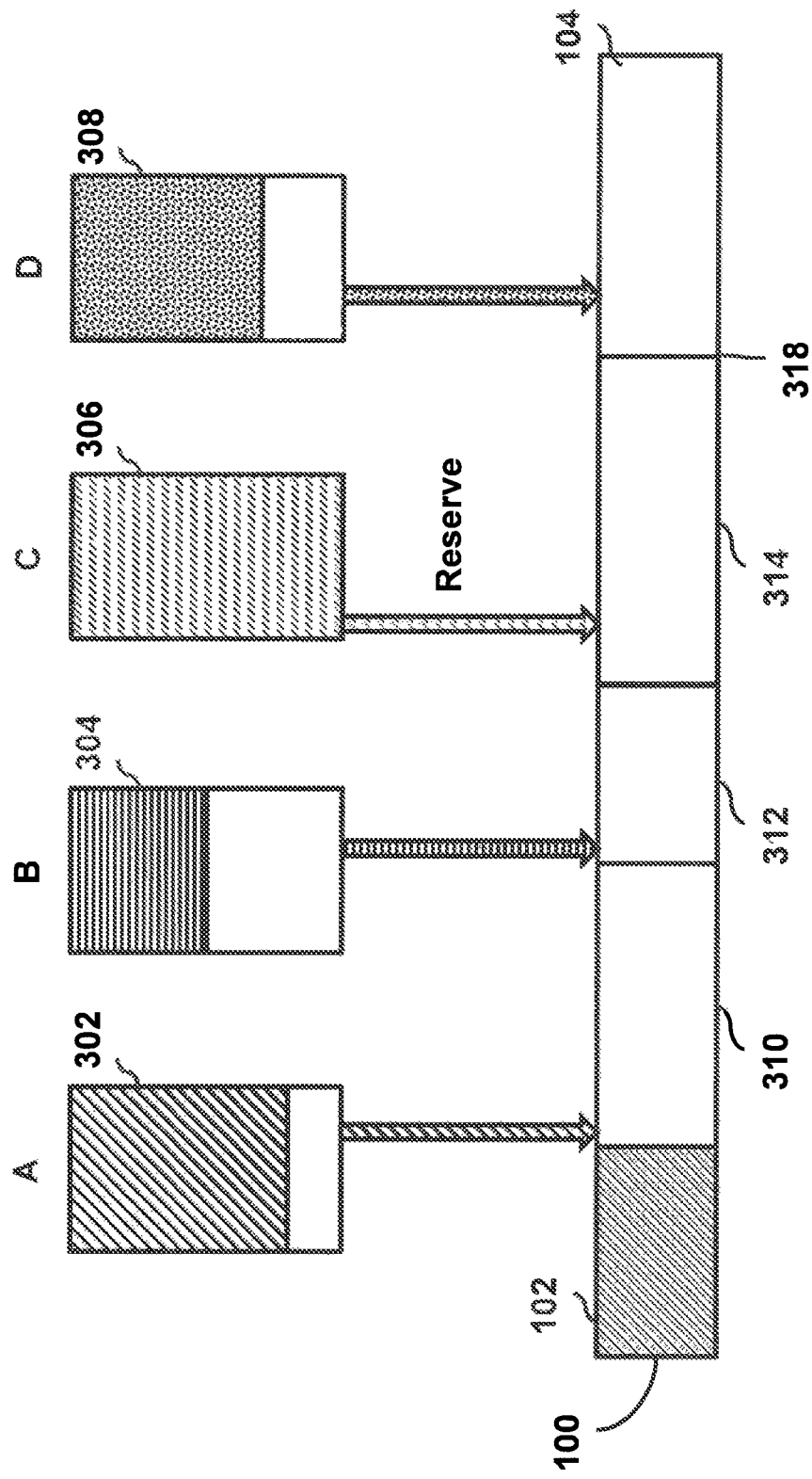
Figure 3E:
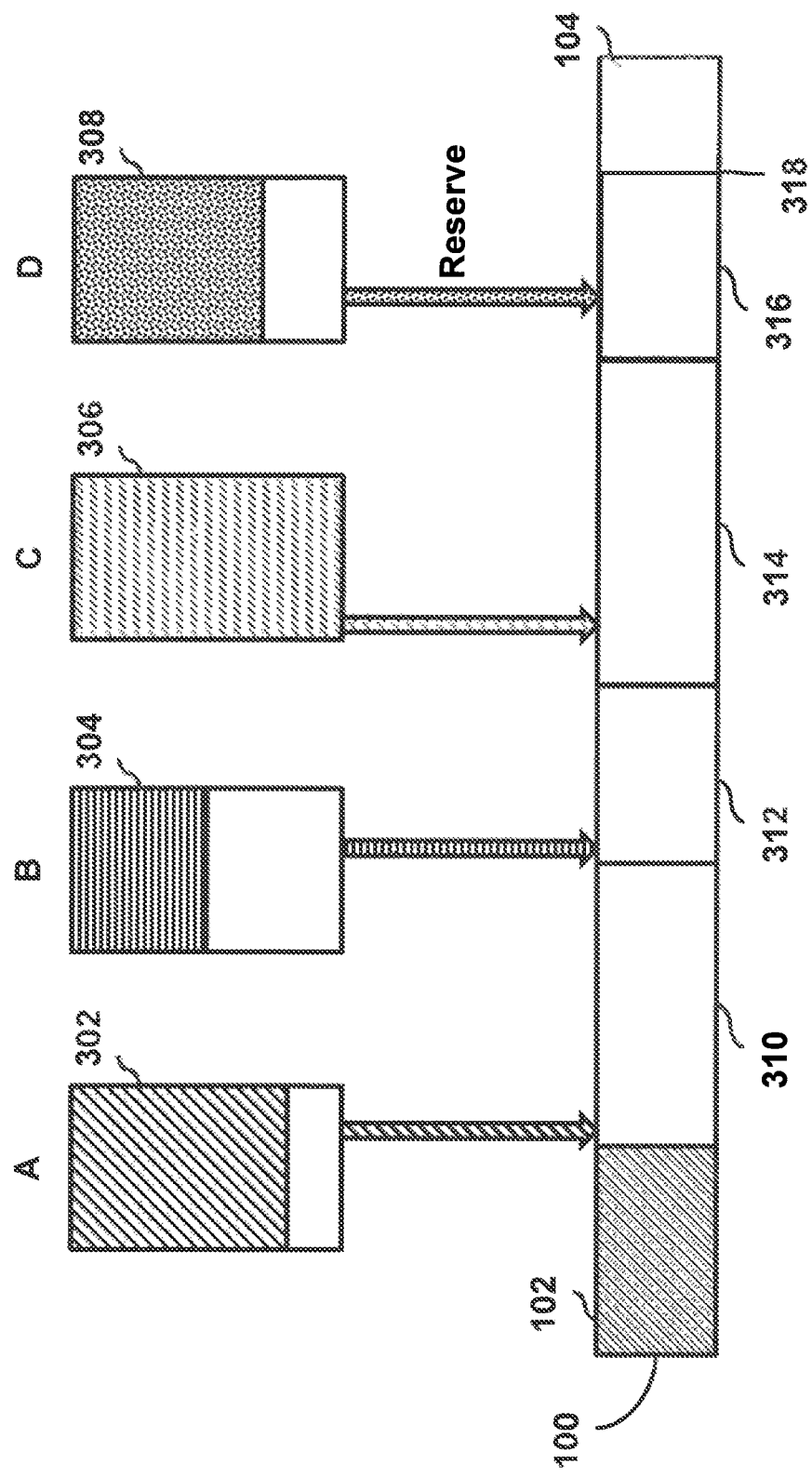
Figure 3F:
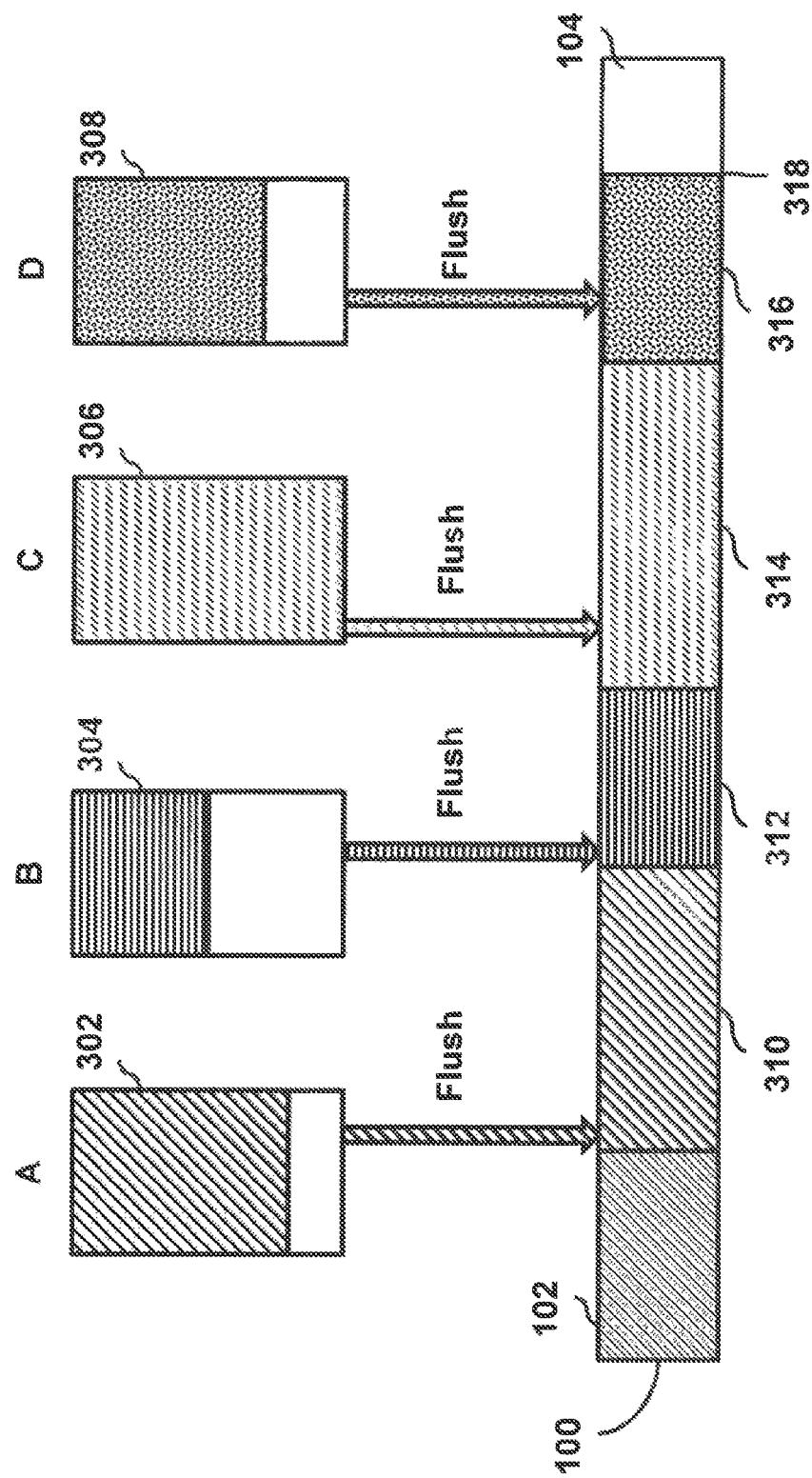

In contrast to the process depicted in FIGS. 2A-2E, in the process of FIGS. 3A-3F, the tasks reserve the space to which they will write their data prior to writing it. As shown in FIG. 3B, task A can calculate the space required to store data 302 and reserve an appropriate amount of space for its data at memory location 310 by updating the end marker 318 to reflect the size of the required space. This allows the next task, task B, to similarly calculate the space it requires and reserve memory location 312 and update the marker 318, as shown in FIG. 3C. Next, tasks C and D can calculate the space required for their data 306 and 308 and reserve their corresponding memory locations 314 and 316 and update the marker 318, as appropriate, as shown in FIGS. 3D and 3E, respectively. As depicted in FIG. 3F, all of the tasks can then write to the shared memory resource 100 in parallel (although it need not occur in parallel, or entirely in parallel). According to embodiments of the invention, each of the tasks begins writing data as soon as it has finished calculating the amount of space it requires and updating the end marker. By employing such a method, contention is reduced because each task must only wait for the previous task or tasks to update the end marker instead of waiting the comparably longer time for the tasks to completely write their data.

Figure 4:
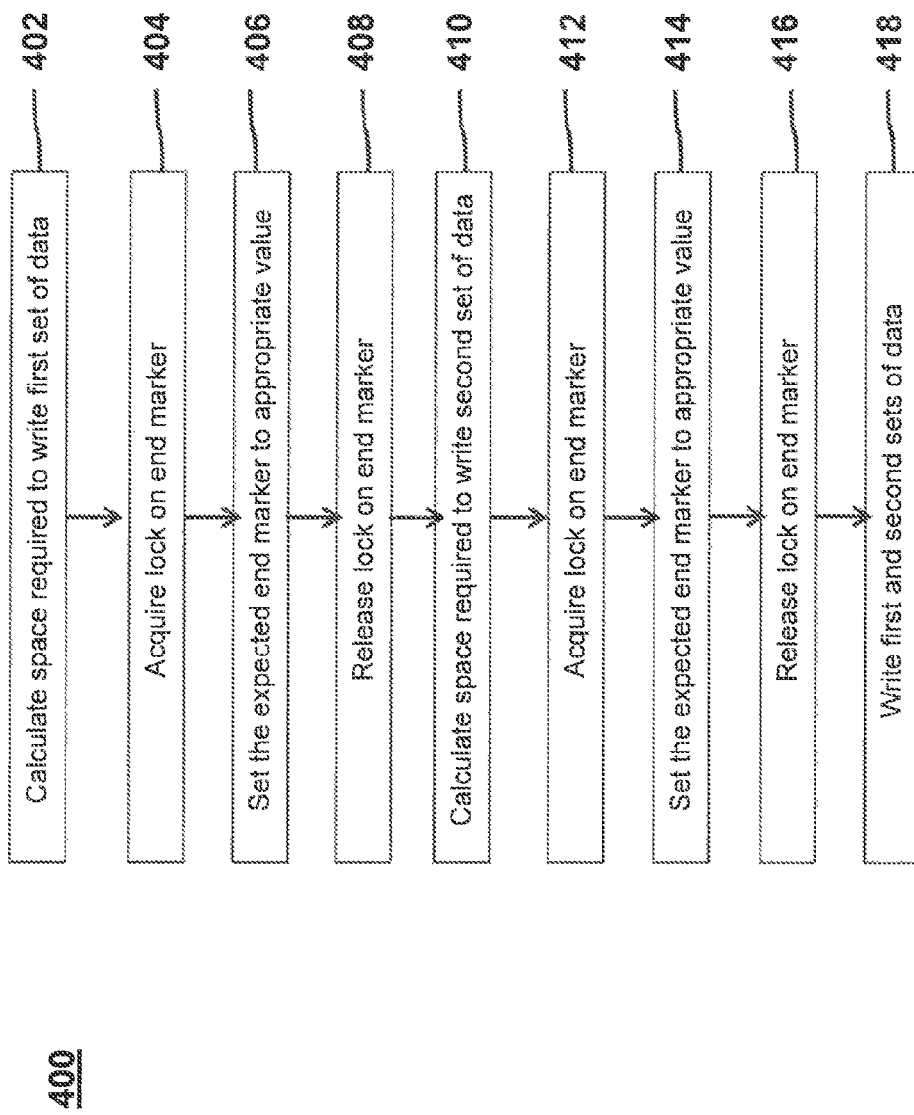
FIG. 4 is a flow chart depicting a method of writing data to a shared memory resource according to embodiments of the invention.

The method that the individual tasks follow in order to facilitate flushing or writing data to the shared memory resource 100 discussed above can be better understood with reference to FIG. 4. FIG. 4 is a flowchart that graphically depicts a method 400 of writing two sets of data, each associated with a task, to a shared memory according to embodiments of the present invention.

At step 402, the first task calculates the space required to write the first set of data to the shared memory. It next acquires a lock on the end marker at step 404. Once the lock has been acquired, the first task reserves the required space on the shared memory by setting the end marker to the appropriate value at step 406. At step 408, the first task releases the lock on the end marker. At step 410, the second task calculates the space required to write the second set of data to the shared memory. It next acquires a lock on the end marker at step 412 and then reserves the required space by setting the end marker to the appropriate value at step 414. The lock on the end marker by the second task is then released at step 416. Both of the first and second sets of data can then be written in parallel to the shared memory resource 100 at step 418. According to some embodiments of the present invention, each task begins writing its data to the shared memory resource upon reserving space in the shared memory resource for its data (more particularly, each task can write to the shared memory resource 100 as soon as such task has set the end marker in step 406 and 414, respectively).

As noted above, the technique described with respect to FIGS. 3A-3F and 4 increases throughput by decreasing contention because each of the tasks only has to wait for a relatively short time before writing data to the shared memory 100 instead of waiting until each previous task is complete. In certain situations, however, an issue with data integrity can arise. For example, when a second task finishes writing its data to the shared memory before a first task, a "hole" of unwritten data in the shared memory will be present between the end of the previously written data and the beginning of the data written by the second task. To address this situation, the process depicted in FIGS. 3A-3F can be modified, according to embodiments of the invention. This modification is depicted in FIGS. 5A-5I and 6.

As was the case above, FIGS. 5A-5I depict a scenario where tasks A, B, C, and D each need to write data 502, 504, 506, and 508 to shared memory 100. The shared memory 100 includes a portion 102 to which data has already been written and a portion 104 that is unwritten. Marker 518 indicates the end of the continuous written data. The memory locations before the marker 518 are written fully without holes. The memory locations after the marker are either entirely unwritten or they contain holes. Since marker 518 cannot have any holes before it, it is necessary to introduce a second marker 522 in order to facilitate tasks reserving their memory locations prior to writing their data to the shared memory. The second marker 522 indicates the expected end of the written data in the shared memory once all of the tasks have completed writing to the shared memory.

Figure 5A:
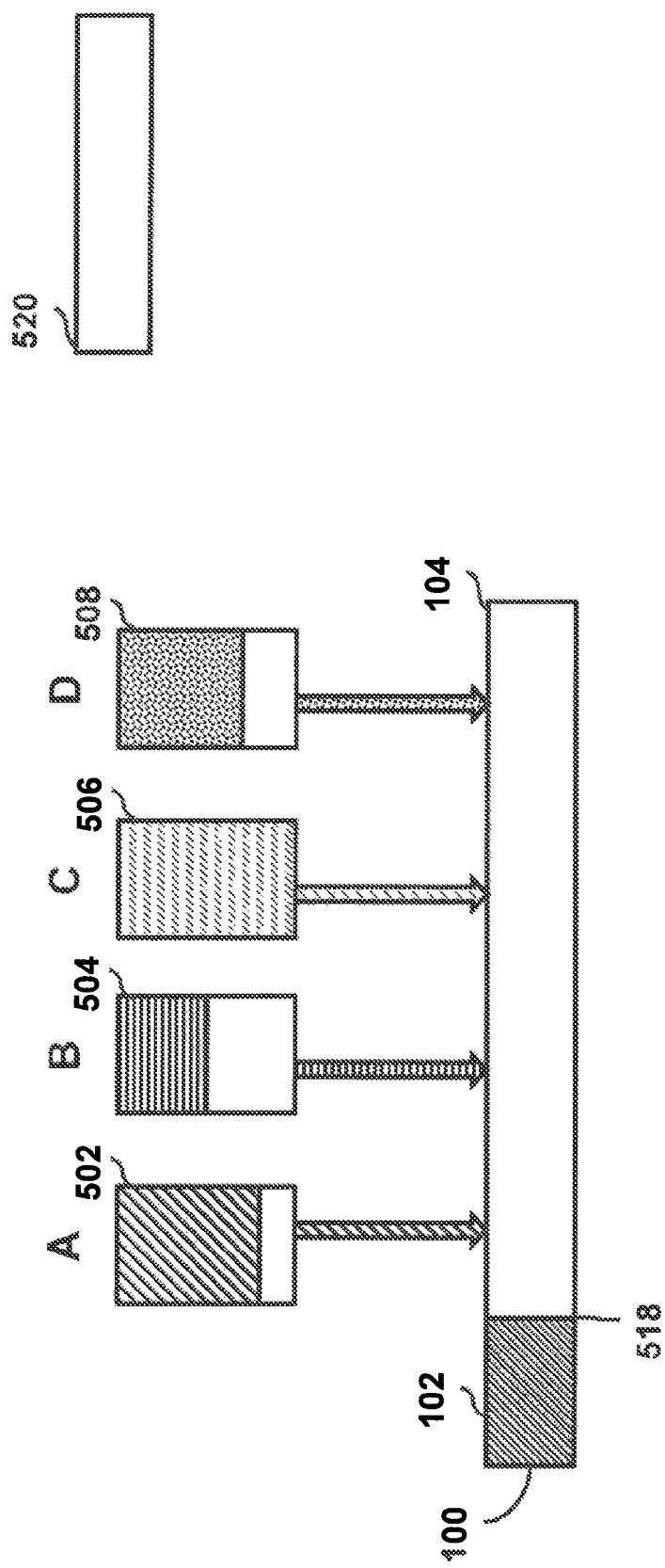
FIGS. 5A-5I depict a process of writing data from multiple tasks to a memory resource according to embodiments of the invention.
Figure 5B:
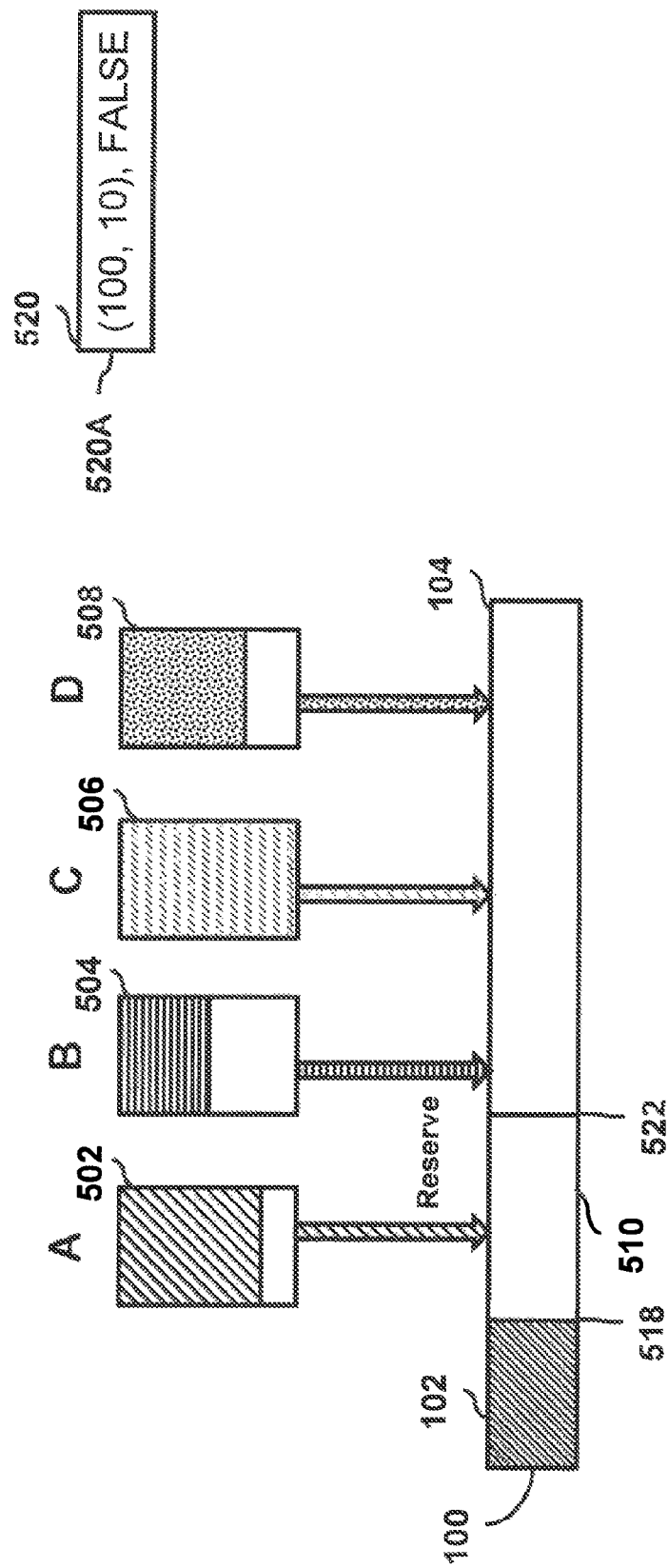

As shown in FIG. 5B, task A calculates the amount of memory it will require and reserves an appropriate amount of memory at location 510 by updating a second marker 522, which indicates the expected end of the data after task A has completed writing data 502 to memory location 510. Additionally, task A writes the value of end of address of the end of the data it has reserved into a data structure 520. In this case, the end address is shown in (page number, offset) format at entry 520A in data structure 520. By way of example, assume that second marker 522 is initially set to page 100, offset 0. FIG. 5B depicts task A as reserving up to page 100, offset 10. Additionally, a flag is set to FALSE in order to indicate that data 502 has not been completely written to memory location 510.

Figure 5C:
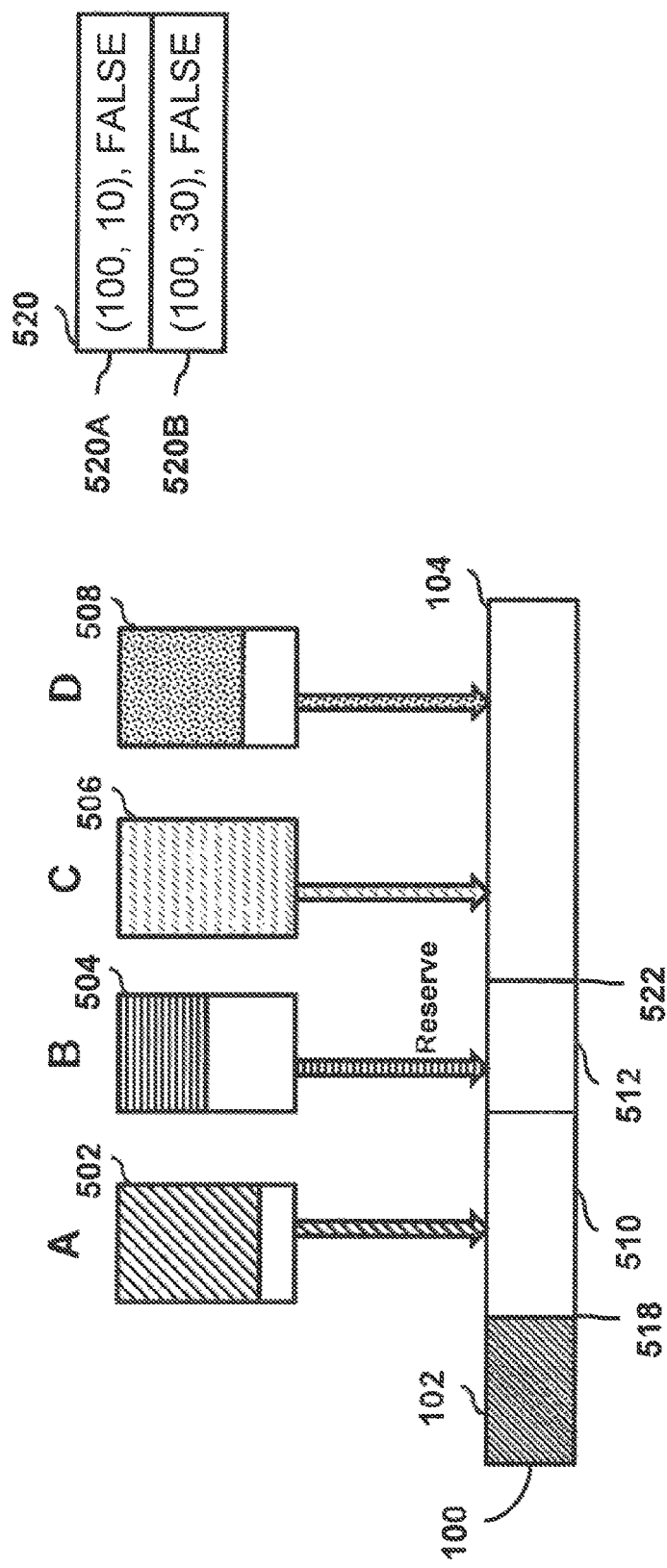
Figure 5D:
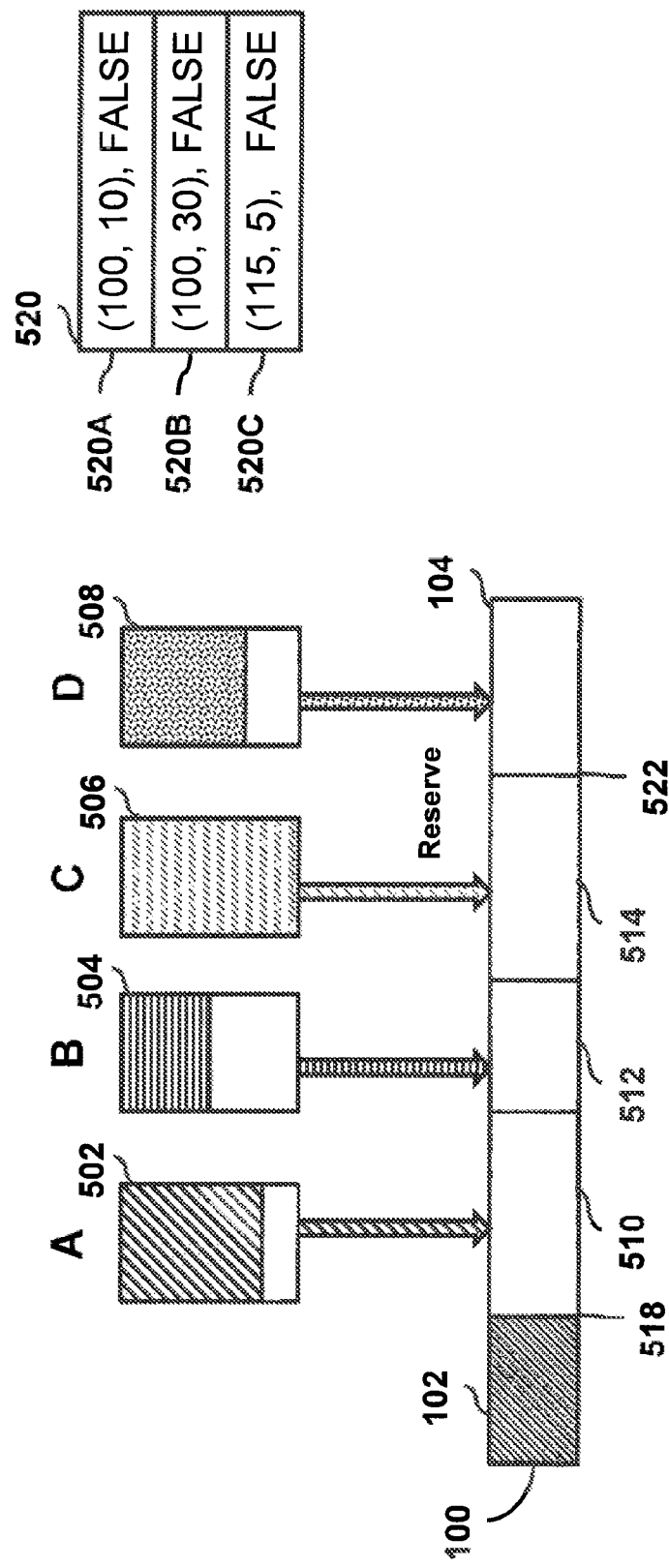
Figure 5E:
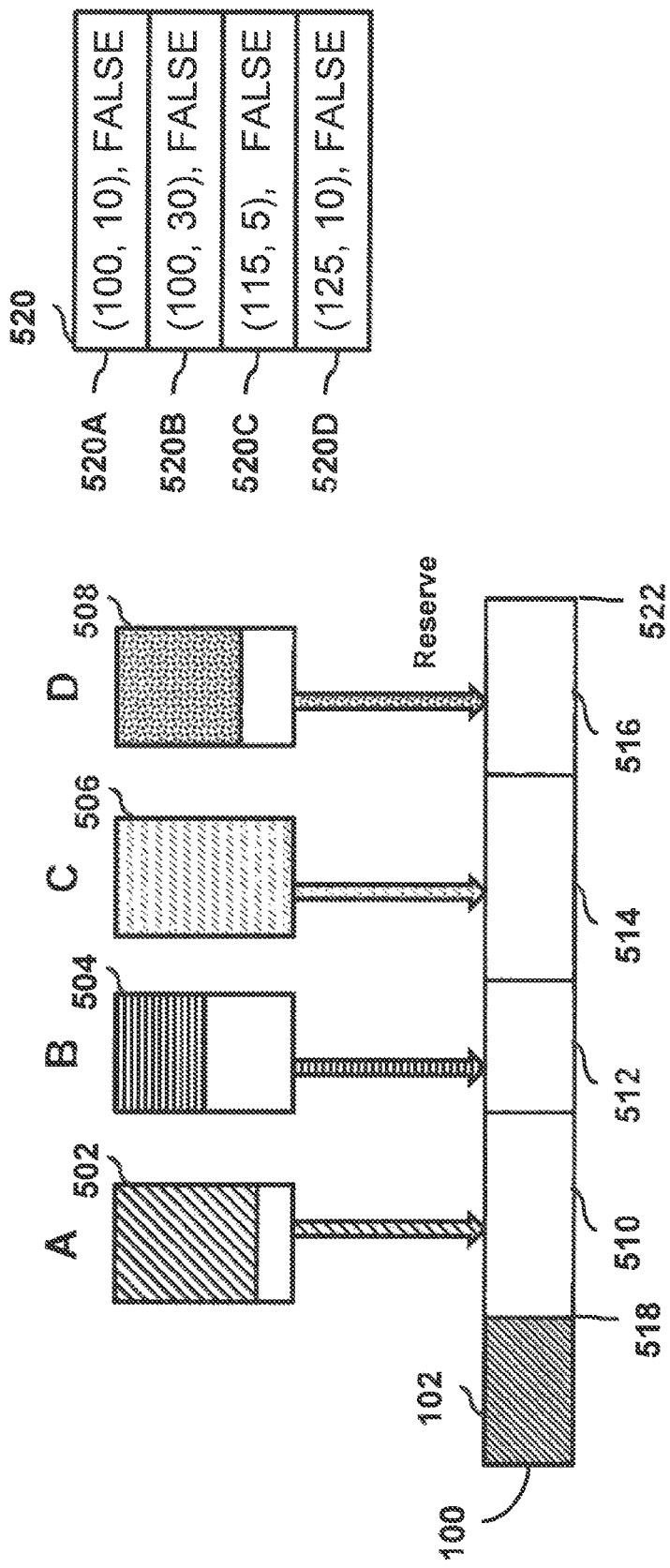

In FIG. 5C, task B similarly calculates the space it will require and reserves memory location 512 for its data 504 and updates the second marker 522 to reflect the end of data after data 506 has been written to memory location 514. Again, task B writes the memory location of the expected end of its data to data structure 520 at 520B and sets a flag to FALSE. In this example, 520B is written to indicate that the end of memory location 512 will be page 100, offset 30. FIG. 5D depicts task C calculating the required space and reserving memory location 514 by updating the second marker 522 and adding the end of its data to data structure 520 at 520C. Task C's associated flag is also set to FALSE. 520C, in this example, indicates that the end of memory location 514 is at page 115, offset 5. In FIG. 5E, the memory location 516 is reserved for data 508 by task D and the second marker 522 is updated. Data structure 520 is also updated to reflect the end of the reserved memory location 516 and to set the flag to FALSE. 520D, in this example, indicates that the end of memory location 516 is page 125, offset 10.

Figure 5F:
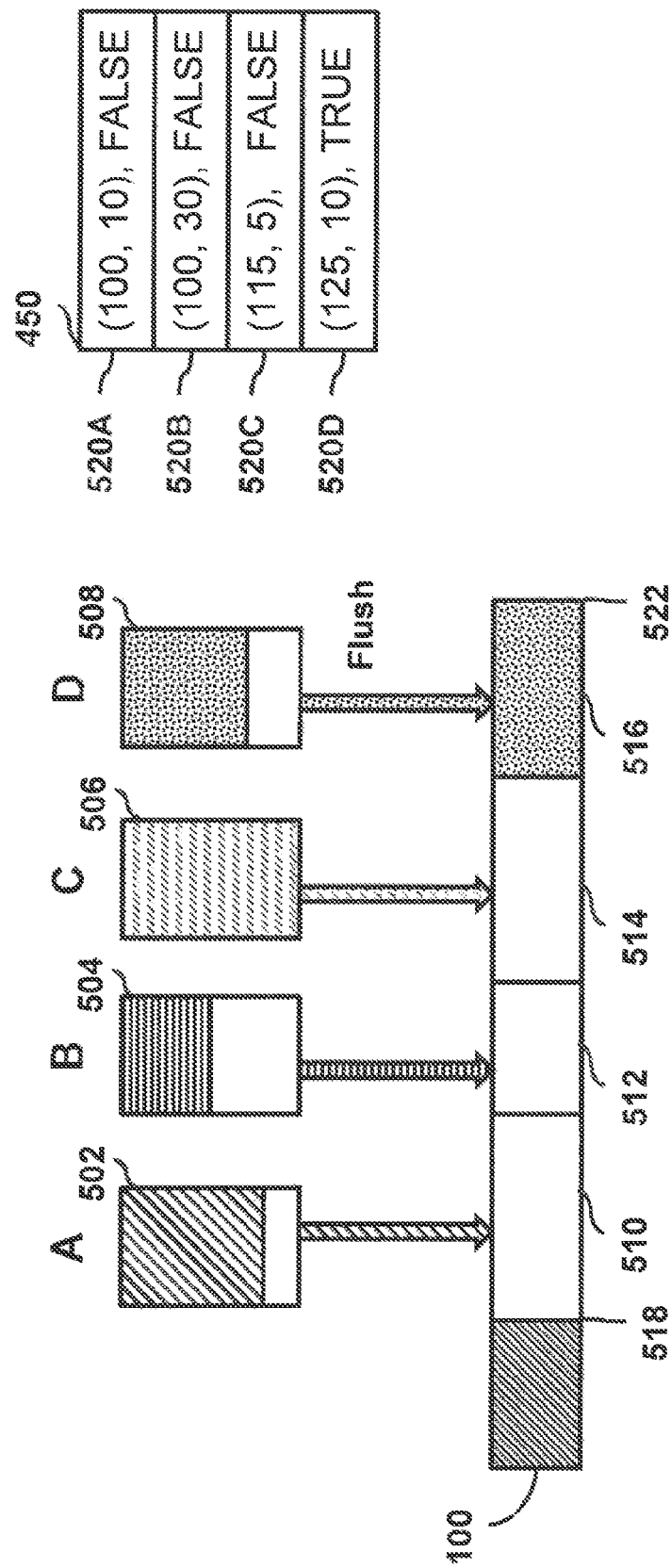

The tasks proceed with writing their data to the shared memory 100. According to embodiments of the invention, when a task completes writing its data, it then sets its flag to TRUE in order to indicate that the memory write is complete. This is depicted in FIG. 5F, which shows that task D has completed writing its data 508 to memory location 516. Accordingly, it sets its flag stored at location 520D in data structure 520 to TRUE in order to indicate that the writing is complete. At this point, there is a "hole" in the shared memory 100 comprising memory locations 510, 512, and 514. Accordingly, the end marker remains at its location prior to memory location 510.

Figure 5G:
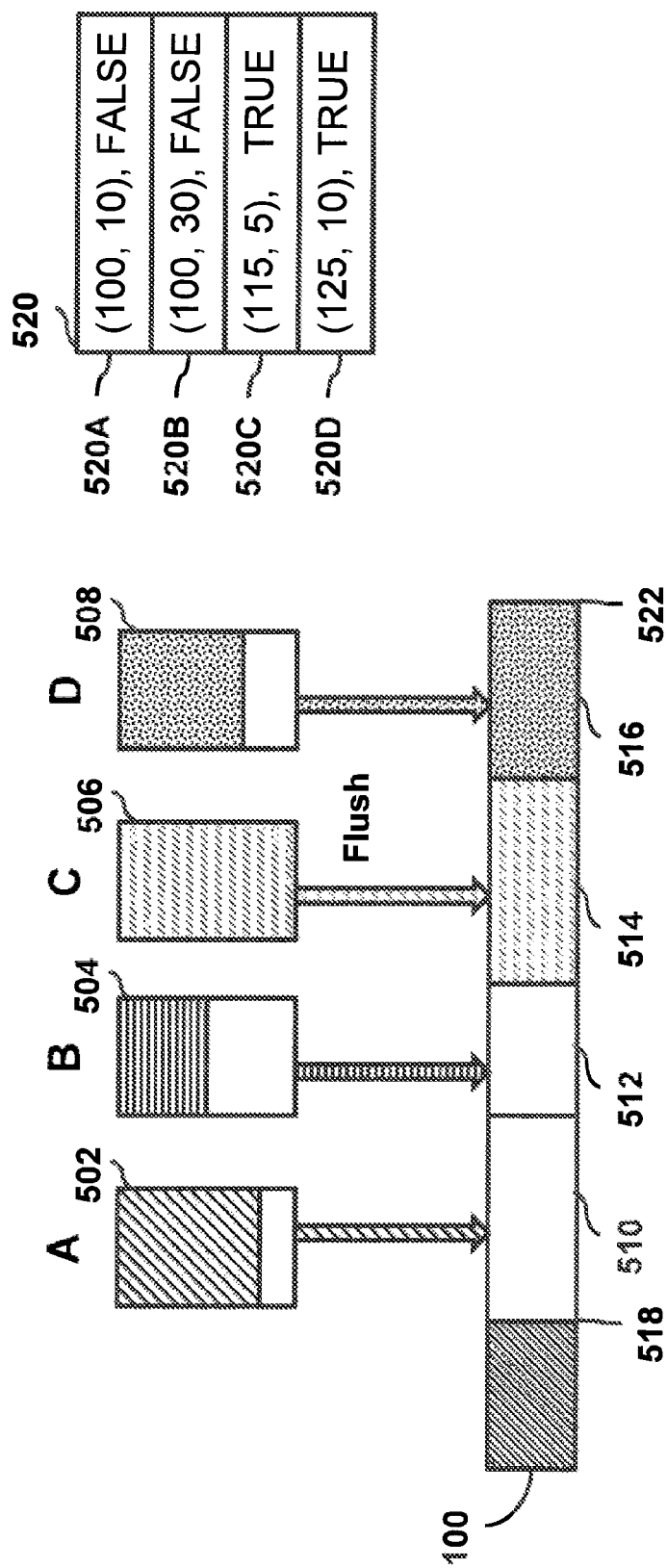

FIG. 5G depicts the shared memory 100 after task C has completed writing its data 506 to memory location 514. Again, it has updated its flag at 520C in data structure 520 to TRUE to indicate that the memory write is complete. Because a hole comprising memory locations 510 and 512 still remains, however, the end marker 518 stays unchanged.

Figure 5H:
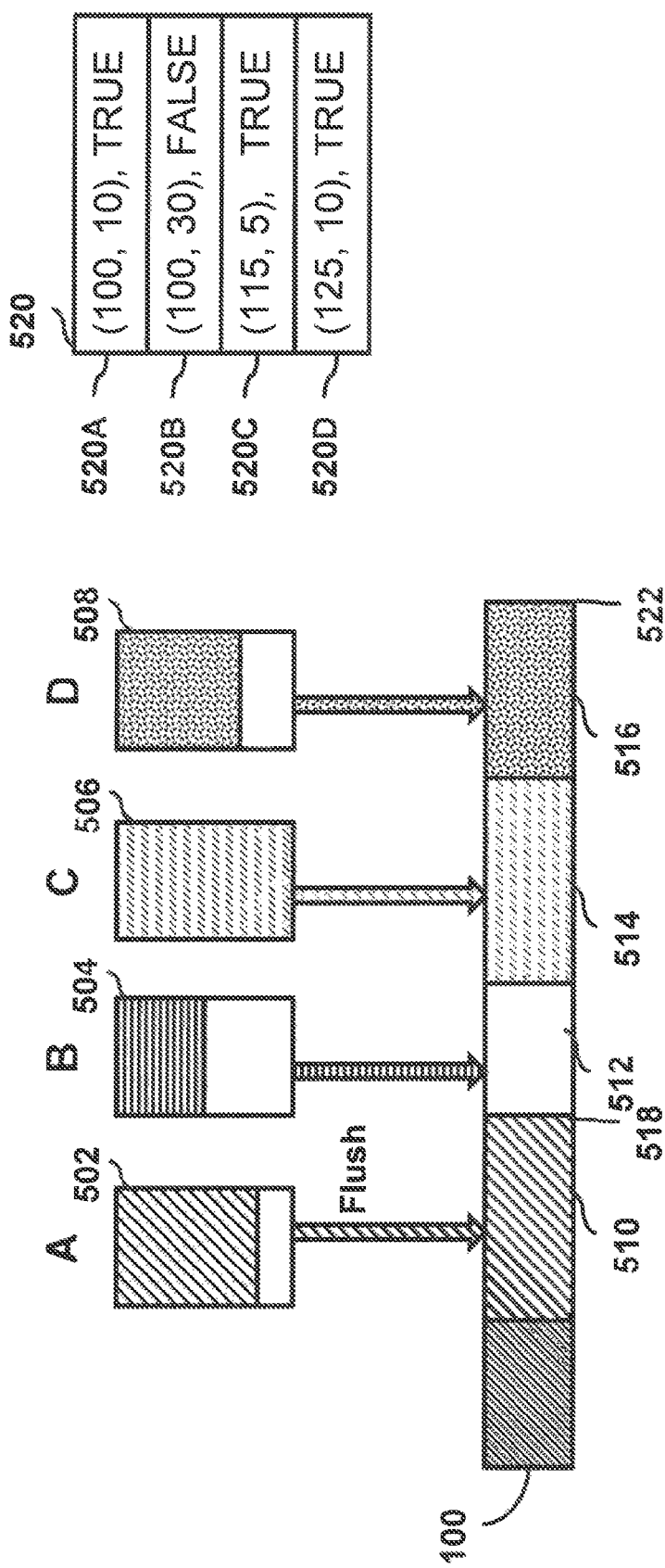

FIG. 5H depicts the shared memory after task A has completed writing its data 502 to memory location 510. As was the case after the completion of writing by the other tasks, task A has updated its flag at 520A in data structure 520 to TRUE to indicate that it has completed writing. Additionally, because there is no longer a hole in the shared memory at memory location 510, the end marker 518 has been updated to the end of memory location 510. A hole remains in the memory at location 512.

Figure 5I:
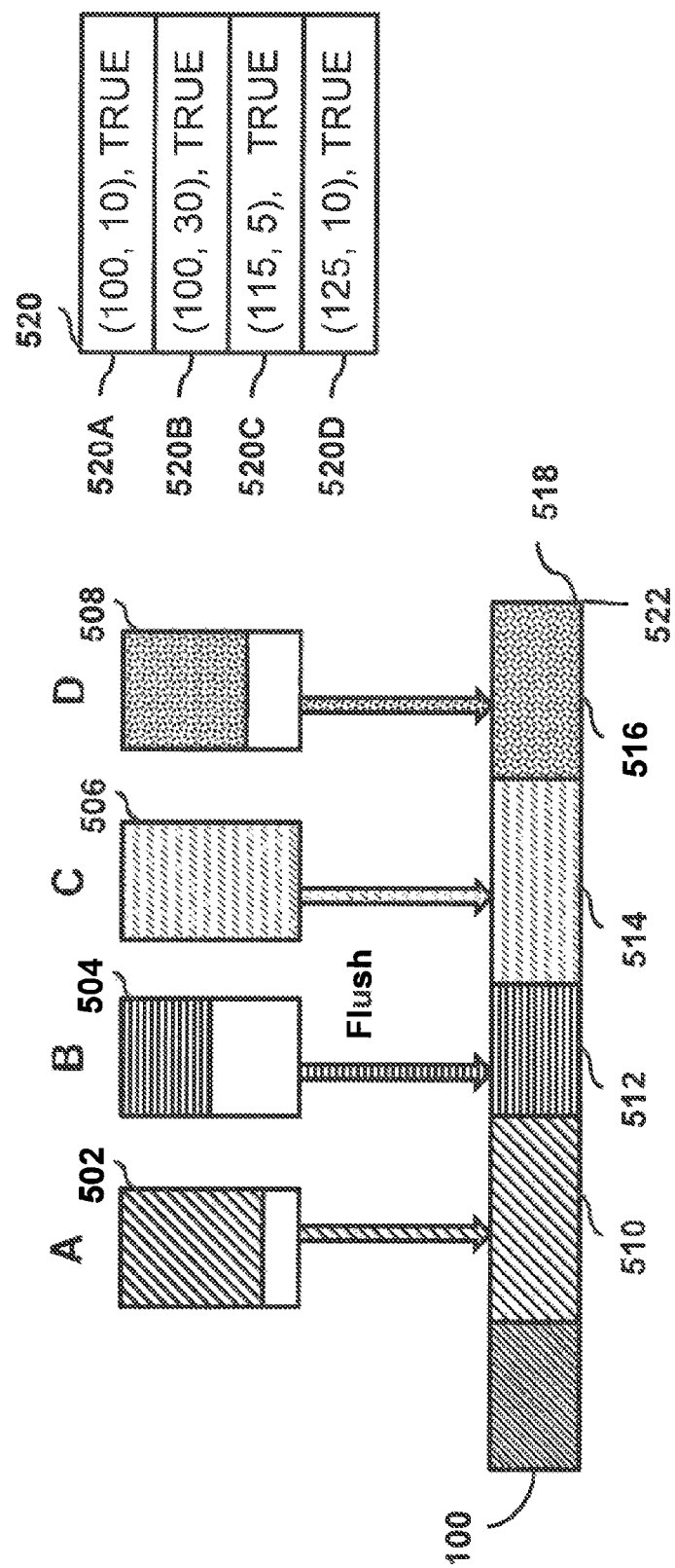

FIG. 5I depicts the situation after task B has writing its data 504 to memory location 512. It has set its flag stored at 520B to true in order to indicate that writing is complete. Additionally, because there are now no holes remaining before the second marker 522, the end marker 518 has been set to the same location as second marker 522.

Figure 6:
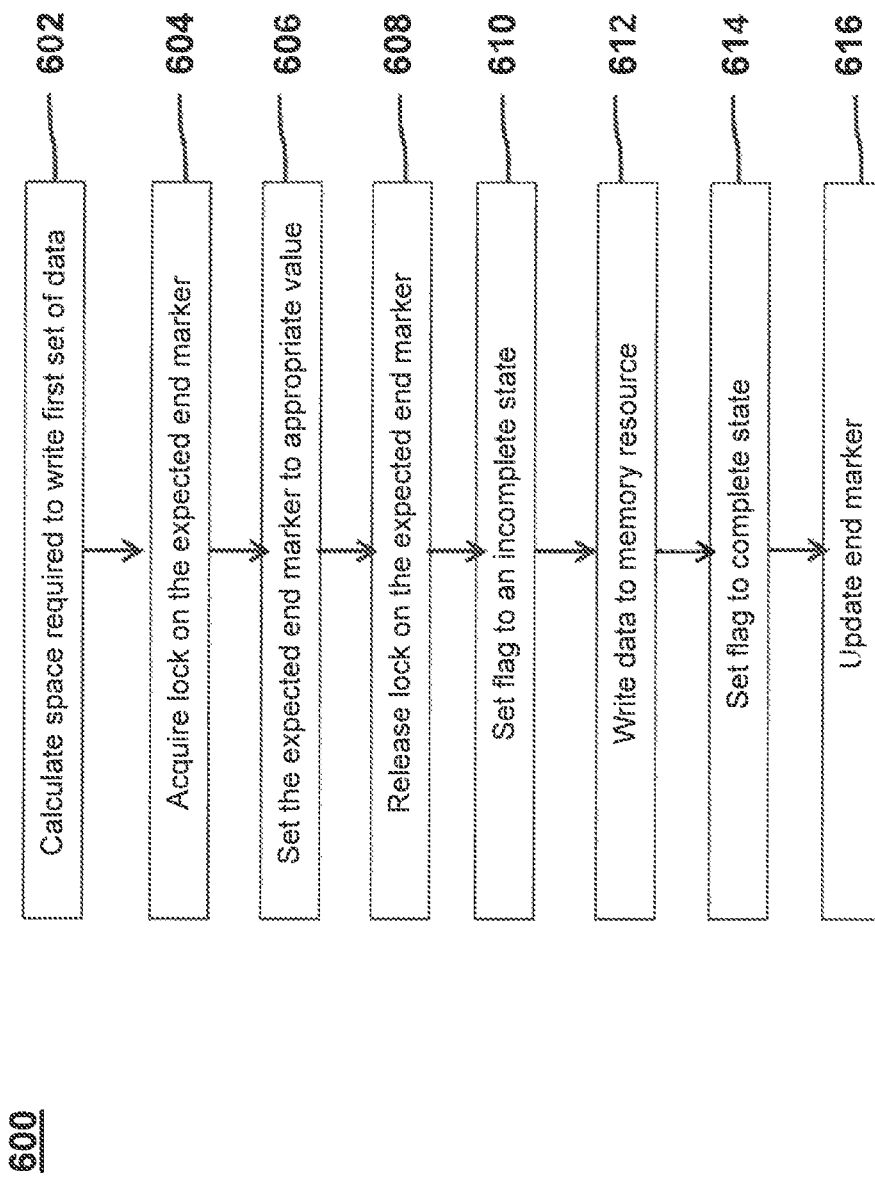
FIG. 6 is a flow chart depicting a method of writing data to a shared memory resource according to embodiments of the invention.

In order to effect the process discussed with reference to FIGS. 5A-5I, each of the tasks can perform the method 600 depicted in FIG. 6, according to embodiments of the present invention. At step 602, the task calculates the space required to write its set of data to the shared memory. Next, at step 604, the task acquires a lock on an expected end marker and reserves the required space by setting the expected end marker to the appropriate value at step 606. The task then releases the lock at step 608. A flag in an associated data structure is set to indicate an incomplete state at 610 and the task begins writing its data to the memory resource at step 612. After the data has been fully written to the shared memory resource, the flag in the associated data structure is set to a complete state at 614. The system can then update the end marker as appropriate at step 616.

Figure 7:
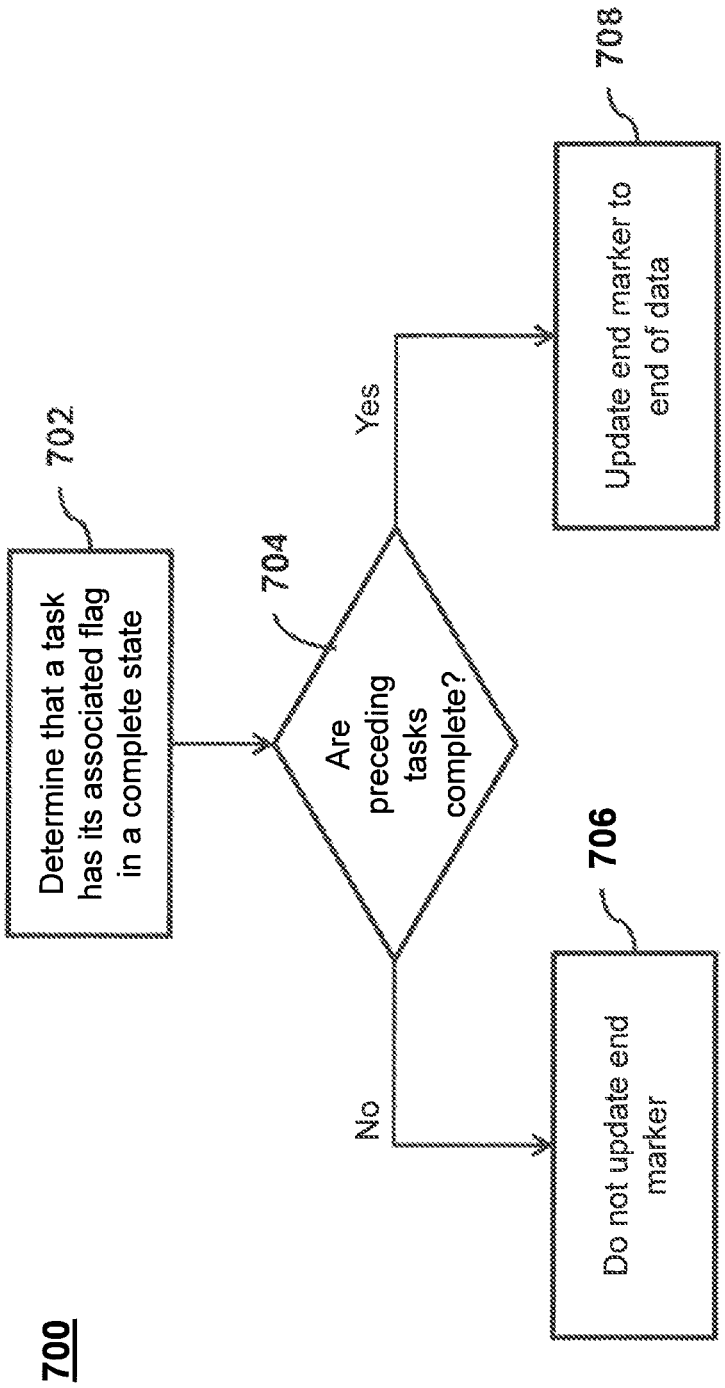
FIG. 7 is a flow chart depicting a method up updating an end marker according to embodiments of the invention.

FIG. 7 depicts a method 700 of updating the end marker according to embodiments of the present invention. At step 702, it is determined that a task has its associated flag in a complete state. According to some embodiments, this check occurs each time a task changes the state of its associated flag to complete. According to the method, a check is performed at step 704 to determine whether the preceding tasks are complete. If they are not complete, then the end marker will remain un-updated as indicated at step 706. If, however, the preceding tasks are complete, then the end marker can be updated to indicate the end of the continuously written data at step 708. According to some embodiments, the check performed at step 704 only checks to determine whether the immediately preceding task.

Figure 8:
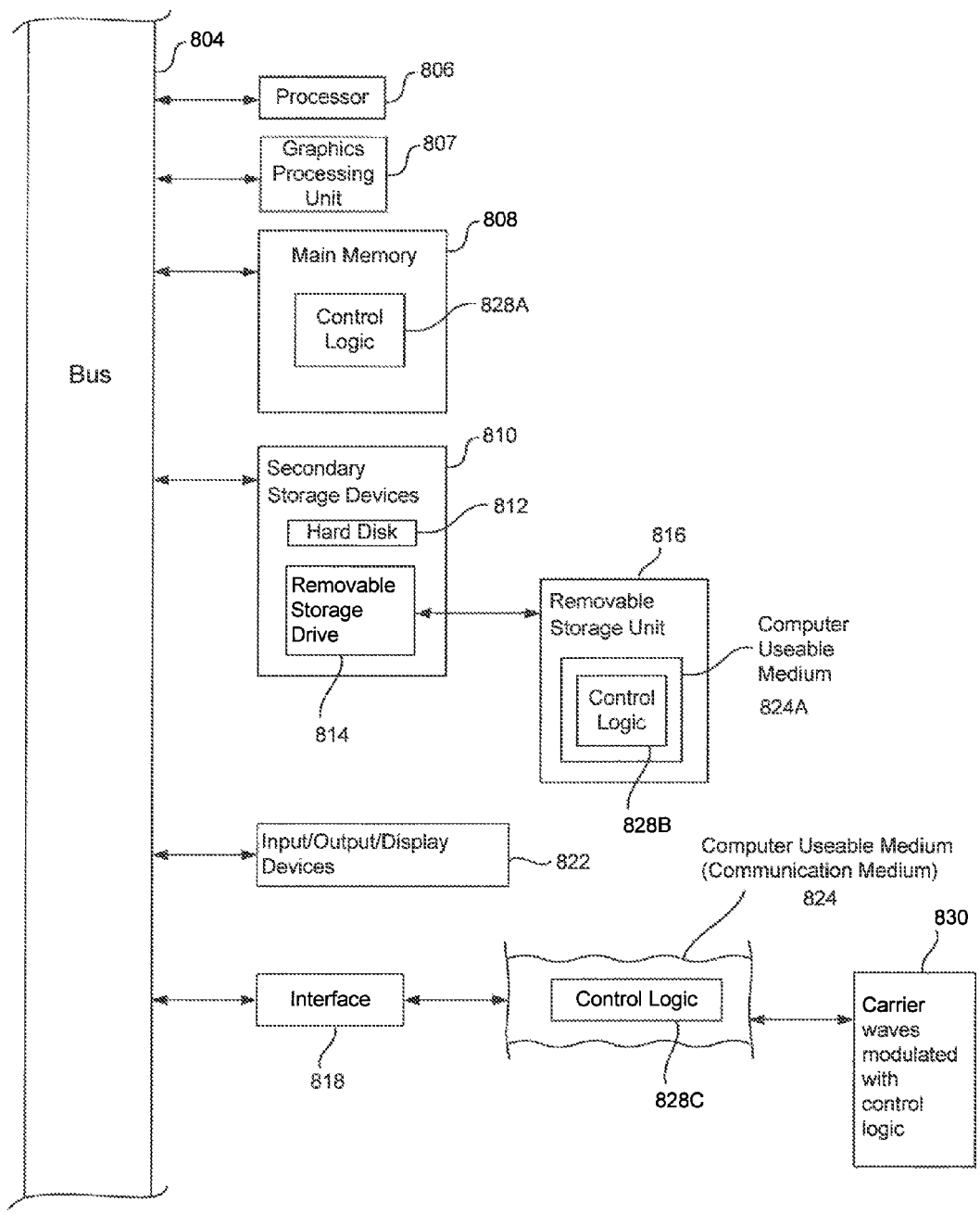
FIG. 8 is a functional block diagram of a computer system according to embodiments of the present invention.

In an embodiment of the present invention, the system and components of the present invention described herein are implemented using well known computers, such as computer 800 shown in FIG. 8.

Computer 800 can be any commercially available and well known computer capable of performing the functions described herein, such as computers available from International Business Machines, Apple, Sun, HP, Dell, Compaq, Digital, Cray, etc.

Computer 800 includes one or more processors (also called central processing units, or CPUs), such as a processor 806. The processor 806 is connected to a communication bus 804. Processors 806 may include any conventional or special purpose processor, including, but not limited to, digital signal processor (DSP), field programmable gate array (FPGA), and application specific integrated circuit (ASIC).

Computer 800 includes one or more graphics processing units (also called GPUs), such as GPU 807. GPU 807 is a specialized processor that executes instructions and programs selected for complex graphics and mathematical operations in parallel.

Computer 800 also includes a main or primary memory 808, such as random access memory (RAM). The primary memory 808 has stored therein control logic 828A (computer software), and data.

Computer 800 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

Computer 800 also includes input/output/display devices 822, such as monitors, keyboards, pointing devices, touchscreen displays, etc.

Computer 800 further includes a communication or network interface 818. The network interface 818 enables the computer 800 to communicate with remote devices. For example, the network interface 818 allows computer 800 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from computer 800 via the communication medium 824B. More particularly, the computer 800 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 800, the main memory 808, the secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of reducing contention between a plurality of tasks attempting to simultaneously write data to a memory resource in a computer system, wherein the memory resource includes an end marker that indicates an end of data stored in the memory resource, the method comprising:
   calculating space required in the memory resource to write a first set of data associated with a first task;

updating an expected end marker to reflect space required to store the first set of data;
calculating space required in the memory resource to write a second set of data associated with a second task;
updating the expected end marker to reflect space required to store the second set of data;
writing the first and second sets of data to the memory resource in parallel; and
updating the end marker.

2. The method according to claim 1, wherein the steps of updating the expected end marker each include:
acquiring a lock;
setting the expected end marker to an appropriate value; and
releasing the lock.

3. The method according to claim 1, wherein the steps of updating the expected end marker each include setting the end marker to mark end of continuously written data.

4. The method according to claim 1, further comprising defining a data structure comprising a plurality of flags, each flag associated with a task, wherein each flag is configured to indicate a complete state and an incomplete state.

5. The method according to claim 4, further comprising setting a first flag associated with the first task to an incomplete state and setting a second flag associated with a second task to an incomplete state.

6. The method according to claim 5, further comprising the step of setting the first flag to a completed state after the first set of data has been fully written to the memory resource.

7. The method according to claim 5, further comprising the step of setting the second flag to a completed state after the second set of data has been fully written to the memory resource.

8. The method according to claim 4, wherein the steps of updating the expected end marker each include:
determining a last task that has its associated flag in a complete state and flags of all preceding flags in a complete state; and
setting the end marker to end of a data set associated with the determined last task.

9. The method according to claim 1, wherein the steps of updating the expected end marker are each performed each time a set of data has been fully written to the memory resource.

10. A method of writing a set of data associated with a task to a memory resource, said method comprising:
calculating an amount of memory required to write the set of data to the memory resource;
updating an expected end marker to reflect the amount of memory required to write the set of data to the memory resource;
setting a flag to an incomplete state;
writing the set of data to the memory resource;
setting the flag to a complete state; and
updating an end marker, the end marker indicating an end of the set of data stored in the memory resource.

11. The method according to claim 10, wherein the step of writing the set of data to the memory resource occurs in parallel with writing a second set of data associated with a second task to said memory resource.

12. The method according to claim 10, wherein the step of updating the expected end marker further includes:
acquiring a lock;
setting the expected end marker to an appropriate value; and
releasing the lock.

13. The method according to claim 10, wherein the step of updating the end marker further comprises:
determining that the flag is in a complete state and that no portion of the memory resource preceding the set of data written to the memory resource remains unwritten; and
setting the end marker to indicate that the end of the set of data stored in the memory resource is the end of the set of data written to the memory resource.

14. The method according to claim 10, wherein the step of updating the end marker includes acquiring a semaphore associated with the end marker.

15. A computer readable medium containing instructions that, when executed by a computer, cause the computer to:
calculate an amount of memory required to write a set of data associated with a task to a memory resource;
update an expected end marker to reflect the amount of memory required to write the set of data to the memory resource;
set a flag to an incomplete state;
write the set of data to the memory resource;
set the flag to a complete state; and
update an end marker, the end marker indicating the end of the data stored in the memory resource.

16. The computer readable medium according to claim 15, wherein the instruction that causes the computer to update the expected end marker also causes the computer to:
acquire a lock;
set the expected end marker to an appropriate value; and
release the lock.

17. The computer readable medium according to claim 15, wherein the instruction that causes the computer to update the end marker further causes the computer to:
determine that the flag is in a complete state and that no portion of the memory resource preceding the set of data written to the memory resource remains unwritten; and
set the end marker to indicate that the end of the set of data stored in the memory resource is the end of the set of data written to the memory resource.

18. The computer readable medium according to claim 15, wherein the instruction that causes the computer to update the end marker also causes the computer to acquire a semaphore associated with the end marker.

19. A computer system comprising:
a memory resource; and
a processor, wherein said processor is configured to:
calculate an amount of memory required to write a set of data associated with a task to a memory resource;
update an expected end marker to reflect the amount of memory required to write the set of data to the memory resource;
set a flag to an incomplete state;
write the set of data to the memory resource;
set the flag to a complete state; and
update an end marker, the end marker indicating an end of the set of data stored in the memory resource.

20. The computer system according to claim 19, wherein the processor, when updating the expected end marker, is configured to:
acquire a lock;
set the expected end marker to an appropriate value; and
release the lock.

21. The computer readable medium according to claim 19, wherein the processor, when updating the end marker, is configured to:
determine that the flag is in a complete state and that no portion of the memory resource preceding the set of data written to the memory resource remains unwritten; and set the end marker to indicate that the end of the set of data stored in the memory resource is the end of the set of data written to the memory resource.

22. The computer readable medium according to claim 19, wherein the processor is configured to update the end marker by acquiring a semaphore associated with the end marker.

* * * * *